United States Patent
Lockwood et al.

(10) Patent No.: US 10,564,638 B1
(45) Date of Patent: Feb. 18, 2020

(54) TELEOPERATOR SITUATIONAL AWARENESS

(71) Applicant: Zoox, Inc., Menlo Park, CA (US)

(72) Inventors: Amanda Lee Kelly Lockwood, Menlo Park, CA (US); Ravi Gogna, San Jose, CA (US); Gary Linscott, Cupertino, CA (US); Paul Orecchio, Cupertino, CA (US); Dan Xie, Santa Clara, CA (US); Ashutosh Gajanan Rege, San Jose, CA (US); Jesse Sol Levinson, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 199 days.

(21) Appl. No.: 15/644,390

(22) Filed: Jul. 7, 2017

(51) Int. Cl.
| | | |
|---|---|---|
| G05D 1/00 | (2006.01) | |
| G06N 7/00 | (2006.01) | |
| G07C 5/08 | (2006.01) | |
| G07C 5/00 | (2006.01) | |
| G06N 3/08 | (2006.01) | |

(52) U.S. Cl.
CPC ............ G05D 1/0088 (2013.01); G05D 1/00 (2013.01); G05D 1/0038 (2013.01); G06N 7/00 (2013.01); *G06N 3/08* (2013.01); *G07C 5/00* (2013.01); *G07C 5/08* (2013.01)

(58) Field of Classification Search
CPC ...... G05D 1/0088; G05D 1/0038; G05D 1/00; G05D 1/02; G06N 3/08; G07C 5/00; G07C 5/08
USPC ....................................................... 701/27
See application file for complete search history.

(56) References Cited

U.S. PATENT DOCUMENTS

| | | | | |
|---|---|---|---|---|
| 9,507,346 | B1 * | 11/2016 | Levinson | G05D 1/0214 |
| 9,612,123 | B1 * | 4/2017 | Levinson | G01C 21/32 |
| 9,720,415 | B2 * | 8/2017 | Levinson | G01S 17/42 |
| 10,268,191 | B1 * | 4/2019 | Lockwood | G05D 1/0022 |
| 10,372,130 | B1 * | 8/2019 | Kaushansky | G05D 1/0088 |
| 10,386,836 | B2 * | 8/2019 | Lockwood | G05D 1/0214 |
| 10,395,444 | B1 * | 8/2019 | Edren | G07C 5/0816 |
| 2015/0248131 | A1 * | 9/2015 | Fairfield | G05D 1/0044 |
| | | | | 701/2 |
| 2016/0358475 | A1 * | 12/2016 | Prokhorov | G05D 1/0011 |
| 2017/0090480 | A1 * | 3/2017 | Ho | G05D 1/0214 |
| 2017/0123421 | A1 * | 5/2017 | Kentley | G01S 17/87 |
| 2017/0124781 | A1 * | 5/2017 | Douillard | G01S 15/931 |
| 2017/0316333 | A1 * | 11/2017 | Levinson | G01S 17/87 |
| 2018/0136651 | A1 * | 5/2018 | Levinson | G05D 1/0044 |
| 2018/0307245 | A1 * | 10/2018 | Khawaja | G05D 1/0276 |
| 2018/0322749 | A1 * | 11/2018 | Kempel | G08B 13/19608 |

(Continued)

*Primary Examiner* — Thomas G Black
*Assistant Examiner* — Wae L Louie
(74) *Attorney, Agent, or Firm* — Lee & Hayes, P.C.

(57) ABSTRACT

A driverless vehicle may include a processor, a sensor, a network interface, and a memory having stored thereon processor-executable instructions. The driverless vehicle may be configured to obtain a stream of sensor signals including sensor data related to operation of the driverless vehicle from the sensor and/or the network interface. The driverless vehicle may be configured to determine a confidence level associated with operation of the driverless vehicle from the sensor data, and store the confidence level and at least a portion of the sensor data. The driverless vehicle may also be configured to transmit via the network interface a request for teleoperator assistance, and the request may include the portion of the sensor data and the confidence level.

20 Claims, 15 Drawing Sheets

(56) References Cited

U.S. PATENT DOCUMENTS

| | | | | |
|---|---|---|---|---|
| 2018/0336468 A1* | 11/2018 | Kadav | .................. | G06K 9/4628 |
| 2018/0365908 A1* | 12/2018 | Liu | ...................... | G05D 1/0022 |
| 2019/0011910 A1* | 1/2019 | Lockwood | ........... | G05D 1/0038 |
| 2019/0011912 A1* | 1/2019 | Lockwood | ........... | G05D 1/0231 |
| 2019/0258246 A1* | 8/2019 | Liu | ...................... | G05D 1/0038 |
| 2019/0286143 A1* | 9/2019 | Ross | ................... | G05D 1/0088 |

\* cited by examiner

| Action (524) | Event Association (526) | Output Bandwidth (528) | Basic Pose Updates (530(1)) | Front Camera (530(2)) | Rear Camera (530(3)) | Left Camera (530(4)) |
|---|---|---|---|---|---|---|
| Turn on hazards; flash lights | All | Low | Stream | Stream | Stream | x |
| Honk horn (near object) | Near occlusion | Low | Stream | Alternate/ Bandwidth | x | x |
| Honk horn (farther object) | Dynamic occlusion | Low | Stream | Bandwidth | x | x |
| Hold vehicle | All | Low | Bandwidth | Alternate/ Bandwidth | Stream | x |
| Go forward over the object | Near occlusion | Low | Bandwidth | Alternate/ Bandwidth | Stream | x |
| Reverse nudge | Dynamic occlusion; Sensor issue | High | Bandwidth | Alternate/ Bandwidth | Alternate/ Bandwidth | x |
| Forward nudge | Dynamic occlusion; Sensor issue | High | Bandwidth | Alternate/ Bandwidth | x | x |
| Bi-directional reverse route | Any occlusion | High | Bandwidth | Bandwidth | Bandwidth | Stream |
| Modify drive line (forward motion) | All | High | Bandwidth | Bandwidth | Stream | Stream |
| Modify drive envelope (forward motion) | All | High | Bandwidth | Bandwidth | Stream | Stream |
| Add area classification | Area occlusion | Low | Bandwidth | Bandwidth | Stream | Stream |
| Modify mission | Any occlusion | Low | Bandwidth | Stream | Stream | Stream |
| Modify object classification | Classification issue | Low | Bandwidth | Bandwidth | Stream | Stream |
| Modify object prediction | Prediction issue | High | Bandwidth | Bandwidth | Stream | Stream |
| Pull over to curb (non-emergency) | All | High | Bandwidth | Bandwidth | Alternate/ Bandwidth | Alternate/ Bandwidth |
| Pull over to curb (emergency) | All | Low | Stream | Stream | Stream | Stream |
| Relax a road rule | All | Low | Bandwidth | Alternate/ Bandwidth | Stream | Stream |
| Use external speaker | Emergency | Low | Stream | Stream | Stream | x |
| Use internal speaker | Emergency | Low | Stream | Stream | Stream | x |
| Open doors | Emergency | Low | Stream | Stream | Stream | x |

*FIG. 5B*

| Action (524) | Right Camera (530(5)) | LIDAR 3D - View (530(6)) | Replay (530(7)) | Interior Camera (530(8)) | Interior Speaker (530(9)) | Exterior Speaker (530(10)) |
|---|---|---|---|---|---|---|
| Turn on hazards; flash lights | x | Stream | Stream | x | x | x |
| Honk horn (near object) | x | Alternate/ Bandwidth | Stream | x | x | x |
| Honk horn (farther object) | x | Stream | Stream | x | x | x |
| Hold vehicle | x | Alternate/ Bandwidth | Stream | x | x | x |
| Go forward over the object | x | Bandwidth | Stream | x | x | x |
| Reverse nudge | x | Bandwidth | Stream | x | x | x |
| Forward nudge | x | Bandwidth | Stream | x | x | x |
| Bi-directional reverse route | Stream | Bandwidth | Stream | x | x | x |
| Modify drive line (forward motion) | Stream | Bandwidth | Stream | x | x | x |
| Modify drive envelope (forward motion) | Stream | Bandwidth | Stream | x | x | x |
| Add area classification | Stream | Bandwidth | Stream | x | x | x |
| Modify mission | Stream | Stream | Stream | x | x | x |
| Modify object classification | Stream | Bandwidth | Stream | x | x | x |
| Modify object prediction | Stream | Bandwidth | Stream | x | x | x |
| Pull over to curb (non-emergency) | Stream | Bandwidth | Stream | x | x | x |
| Pull over to curb (emergency) | Stream | Stream | Stream | x | Stream | Stream |
| Relax a road rule | Stream | Alternate/ Bandwidth | Stream | x | x | x |
| Use external speaker | x | Stream | Stream | x | Stream | Bandwidth |
| Use internal speaker | x | Stream | Stream | Stream | Bandwidth | Stream |
| Open doors | x | Stream | Stream | Stream | Stream | Stream |

*FIG. 5C*

TELEOPERATOR SITUATIONAL AWARENESS

BACKGROUND

Semi- and fully-autonomous vehicles introduce a new set of technical challenges relative to driver-operated vehicles. In particular, fully-autonomous vehicles that may not include driving controls for operating the vehicle such as a steering wheel, a braking pedal, and an accelerator, for example, introduce further technical challenges. For example, an autonomous vehicle may encounter a scenario that has not previously been encountered or that is complex enough that the autonomous vehicle cannot operate, or identify with a sufficient level of certainty, that a correct operation has been chosen. Since some fully-autonomous vehicles are not equipped with driving controls, the autonomous vehicle may slow or stop in a manner that causes irritation to passengers of the autonomous vehicle or to drivers of other vehicles, and may impede the flow of traffic and/or the autonomous vehicle's mission.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIGS. 5B and 5C depict a table using natural language to represent structure of an example model of a situational awareness engine.

DETAILED DESCRIPTION

Figure 1:
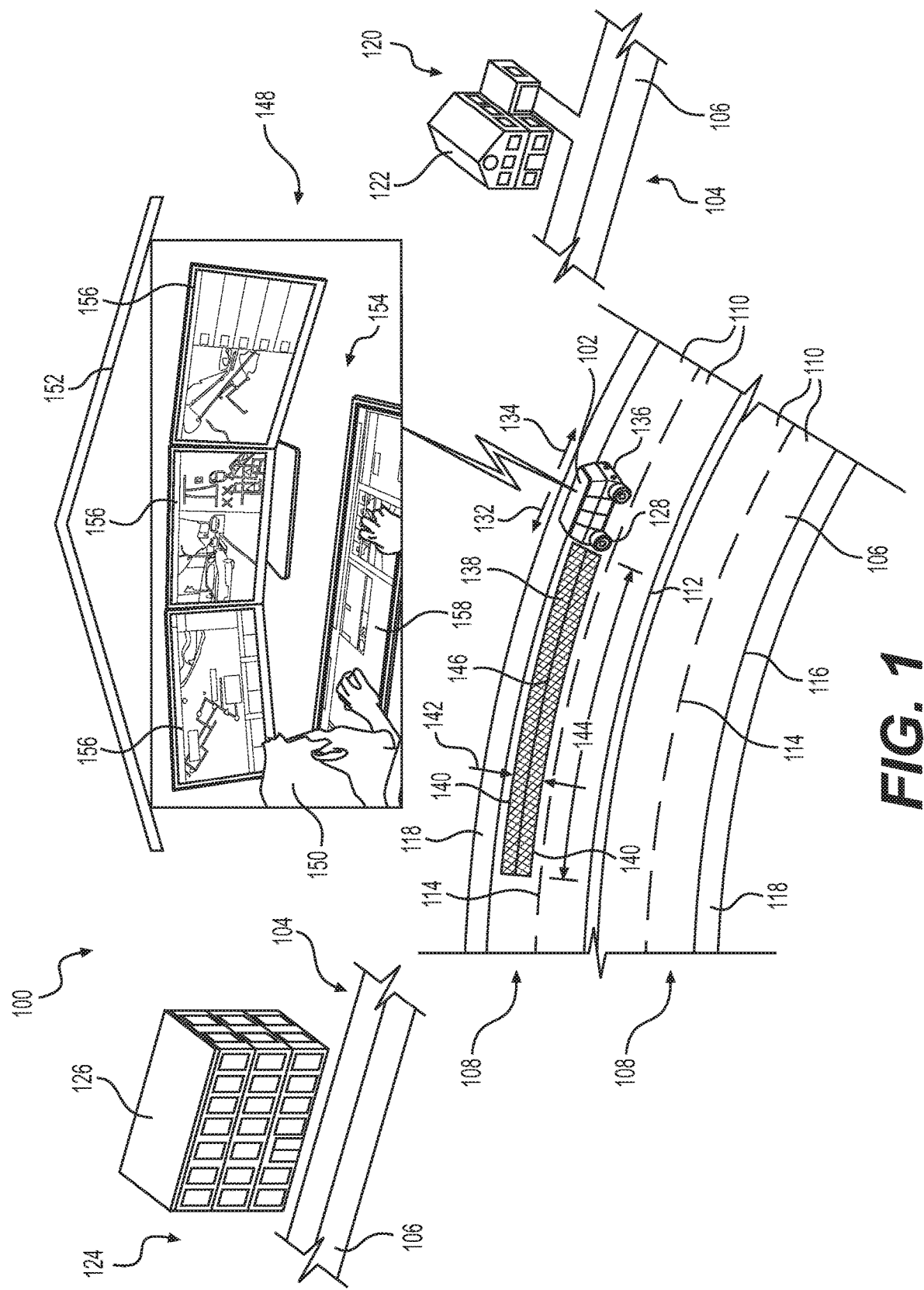
FIG. 1 is a schematic diagram of an example environment through which an example vehicle travels along a road of a road network.

This disclosure describes, in part, processes, apparatuses, and systems for rapidly and accurately providing guidance to a driverless vehicle that has requested teleoperator assistance. The techniques discussed herein may facilitate rapidly apprising a remote operator ("teleoperator") of a situation at a driverless vehicle to obtain real-time guidance for the driverless vehicle that does not cause undue or noticeable delay at the driverless vehicle.

In some examples, a driverless vehicle may encounter an event that is unpredictable in nature, poses safety concerns, or requires responses to spontaneous visual cues or direction from, for example, police officers or construction workers. In some examples, the driverless vehicle is configured to detect that the driverless vehicle is uncertain about its actions (e.g., by determining confidence level(s) associated with a maneuver and/or event). Upon identifying such uncertainty, the driverless vehicle may send a request to a teleoperations device to obtain guidance to resolve the uncertainty and proceed.

The techniques described herein may be designed to quickly bring a teleoperator to full awareness of a situation at a driverless vehicle so that the teleoperator may provide guidance to the driverless vehicle with minimum delay. Delay in relaying this guidance to a driverless vehicle may have consequences ranging from the more trivial (e.g., annoyance of other drivers at a delay of the driverless vehicle or passenger annoyance) to the severe (e.g., a threat to passenger safety). The techniques discussed herein bring the teleoperator to full enough understanding of the situation at the driverless vehicle to quickly formulate guidance that may be relayed to the driverless vehicle.

The techniques discussed herein may include obtaining a request for assistance from a driverless vehicle and providing information regarding the request to a teleoperator via a user interface to quickly and accurately apprise the teleoperator of the situation. In some examples, the information may include sensor data obtained by the driverless vehicle and/or operation state data (e.g., information that the driverless vehicle has collected, amalgamated, and/or created, as discussed in more detail below). In some examples, the teleoperations device may determine a subset of sensor data, operation state data, and/or some representation thereof to present to the teleoperator and/or request from the driverless vehicle. This disclosure also discusses determining presentation arrangement of sensor and/or operation state data to expedite (reduce the delay of) the teleoperator coming to an understanding of the situation that enables the teleoperator to provide guidance to the driverless vehicle.

In some examples, the guidance may include a transmission of processor-executable instructions via a network interface from a teleoperations device to the driverless vehicle. In some examples, the guidance may include direct instructions that configure the driverless vehicle to perform an operation, to collaborate with the driverless vehicle to determine an operation to perform, and/or to confirm a potential operation that the driverless vehicle has determined.

The techniques discussed herein may also include determining one or more options associated with a particular form of guidance to be presented to the teleoperator to expedite transmitting guidance to the driverless vehicle. In some examples, the teleoperations device may determine the option to present based on at least the request, sensor data, operation state data, an elevation of the teleoperations device and/or credentials associated therewith, and/or a definition that specifies a combination thereof. In some examples, some options, upon activation at a first teleoperations device, may trigger an option at a second teleoperations device to confirm, modify, and/or deny the activated option. For example, activation of an option that affects multiple driverless vehicles (e.g., changing driverless vehicle behavior at a defined geographical zone) may trigger transmission of the option to a second teleoperations device for confirmation. In some examples, such a second teleoperations device may have elevated credentials. Upon receiving confirmation and/or modification, the confirmed and/or modified option may be transmitted to one or more driverless vehicles.

The techniques discussed herein may also include dissemination of requests for assistance from multiple driverless vehicles between one or more teleoperations devices and managing interrelation of teleoperations devices. For example, the techniques described herein include disseminating multiple requests from multiple driverless vehicles between multiple teleoperators, and processes for determining the teleoperations device to which to disseminate a particular request. In some examples, multiple teleoperations devices may coordinate providing guidance in a single situation and/or to a single driverless vehicle. In some examples, a single teleoperator may coordinate providing guidance to one or more driverless vehicles.

The techniques and systems described herein may be implemented in a number of ways. Example implementations are provided below with reference to the figures. The implementations, examples, and illustrations described herein may be combined.

Example Environment

FIG. 1 is a schematic diagram of an example environment 100 through which an example vehicle 102 travels. In some examples, the vehicle 102 is an example of a driverless vehicle, as discussed above. The example environment 100 includes a road network 104 including a plurality of example roads 106 having two pairs 108 of lanes 110 separated by a median or double-yellow line 112, with each of the lanes 110 of a pair 108 of lanes 110 defined by a dashed line 114 and lane lines 116. The example road 106 also includes shoulders 118 located on opposite sides of the road 106. FIG. 1 also shows an example geographic location 120 associated with departure location including a structure 122, such as a house or building, and an example destination 124 also including a structure 126, such as a house or building. The road network 104 provides a number of roads 106 defining a route between the geographic location 120 and the destination 124, and FIG. 1 shows an enlarged view of a portion of an example road 106. The road network 104 may include a number of features, such as curves, intersections with cross-roads, crosswalks, traffic signs, traffic lights, railroad crossings, traffic circles, directional arrows, etc.

As shown in FIG. 1, the example vehicle 102 may travel through the example environment 100 via the road network 104 according to a route from the geographic location 120 to the destination 124. For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some examples, since the vehicle 102 may be configured to control all functions from start to route completion, including all parking functions, it may not include a driver and/or implements for controlling the vehicle such as a steering wheel, etc. In some examples, the techniques described herein may be incorporated into any ground-borne, airborne, or waterborne vehicle (or driverless vehicle), including those ranging from vehicles that need to be manually controlled by a driver at all times, to those that are partially or fully autonomously controlled.

For illustration, the example vehicle 102 shown in FIG. 1 is an automobile having four wheels 128 and respective tires for each of the wheels 128. Other types and configurations of vehicles are contemplated, such as, for example, vans, sport utility vehicles, cross-over vehicles, trucks, buses, agricultural vehicles, two-wheeled vehicles, and/or construction vehicles. The vehicle 102 may be powered by one or more internal combustion engines, one or more electric motors, hydrogen power, any combination thereof, and/or any other suitable power sources. In addition, although the example vehicle 102 has four wheels 128, the techniques described herein may be incorporated into vehicles having fewer or a greater number of wheels, tires, and/or tracks.

In some examples, the example vehicle 102 has four-wheel steering and may operate generally with equal performance characteristics in all directions, for example, such that a first end 130 of the vehicle 102 is a front end of the vehicle 102 when travelling in a first direction 132, and such that the first end 130 becomes a rear end of the vehicle 102 when traveling in the opposite, second direction 134, as shown in FIG. 1. Similarly, a second end 136 of the vehicle 102 is the front end of the vehicle 102 when travelling in the second direction 134, and such that the second end 136 becomes the rear end of the vehicle 102 when traveling in the opposite, first direction 132. These example characteristics may facilitate greater maneuverability, for example, in small spaces or crowded environments, such as parking lots and urban areas.

In the example shown in FIG. 1, the vehicle 102 may include one or more sensors and a vehicle controller to autonomously operate through the environment 100 along the route via the roads 106 of the road network 104, as explained in more detail herein. For example, the vehicle controller may be configured to determine operation state data from the sensor data and/or from data received via a network connection. In some examples, the operation state data may include a vehicle corridor 138 defined by virtual boundaries 140 within which the vehicle 102 may travel.

For example, the vehicle corridor 138 may have a variable corridor width 142 in the width direction of the vehicle 102, and a variable corridor length 144 extending in the direction of travel of the vehicle 102. In some examples, the virtual boundaries 140 of the vehicle corridor 138 may be determined based at least in part on sensor data received from sensors associated with the vehicle 102 and/or road network data received by the vehicle 102 via a road network data store, as explained in more detail herein. In some examples, the vehicle 102 may travel along a drive line 146 within the vehicle corridor 138.

In some examples, the vehicle 102 may operate autonomously until the vehicle 102 encounters an event along the route 106 for which it may request assistance from, for example, a teleoperations system 148 located remotely from the vehicle 102. For example, the vehicle 102 may encounter a construction zone associated with a portion of the route, and traffic in the vicinity of the construction zone may be under the direction of a construction worker who provides instructions for traffic to maneuver around the construction zone. Due in part to the unpredictable nature of this type of event, the vehicle 102 may request remote assistance from the teleoperations system 148. As discussed further herein, determination of an event being unpredictable is an alternate or additional manner of determining a confidence level associated with operation of the vehicle 102. In some examples, the vehicle 102 may be a part of a fleet of vehicles in communication via a communications network with the teleoperations system 148, as explained in more detail herein.

In some examples, for example as shown in FIG. 1, the teleoperations system 148 may include one or more teleoperators 150, which may be human teleoperators, located at a teleoperations center 152. In some examples, one or more of the teleoperators 150 may not be human, such as, for example, they may be computer systems leveraging artificial intelligence, machine learning, and/or other decision making strategies. In the example shown, the teleoperator 150 may interact with one or more vehicles 102 in the fleet of vehicles via a user interface that can include a teleoperator interface 154. The teleoperator interface 154 may include one or more displays 156 configured to provide the teleoperator 150 with data related to operation of the vehicle 102, a subset of the fleet of vehicles, and/or the fleet of vehicles. For example, the display(s) 156 may be configured to show data related to sensor signals received from the vehicles 102, data related to the road network 104, and/or additional data or information to facilitate providing assistance to the vehicles 102.

Additionally, or alternatively, the teleoperator interface 154 may also include a teleoperator input device 158 configured to allow the teleoperator 150 to provide information to one or more of the vehicles 102, for example, in the form of teleoperation signals providing guidance to the vehicles 102. The teleoperator input device 158 may include one or more of a touch-sensitive screen, a stylus, a mouse, a dial, a keypad, a microphone, a touchscreen, and/or a gesture-input system configured to translate gestures performed by the teleoperator 150 into input commands for the teleoperator interface 154. As explained in more detail herein, the teleoperations system 148 may provide one or more of the vehicles 102 with guidance to avoid, maneuver around, or pass through events. Additionally, or alternatively, the teleoperator interface 154 can include other input/output device(s) such as, for example, a microphone, a speaker, and/or a haptic feedback device (e.g., to "nudge" the teleoperator 150 to pay attention to a particular region of the teleoperator interface 154).

Figure 2:
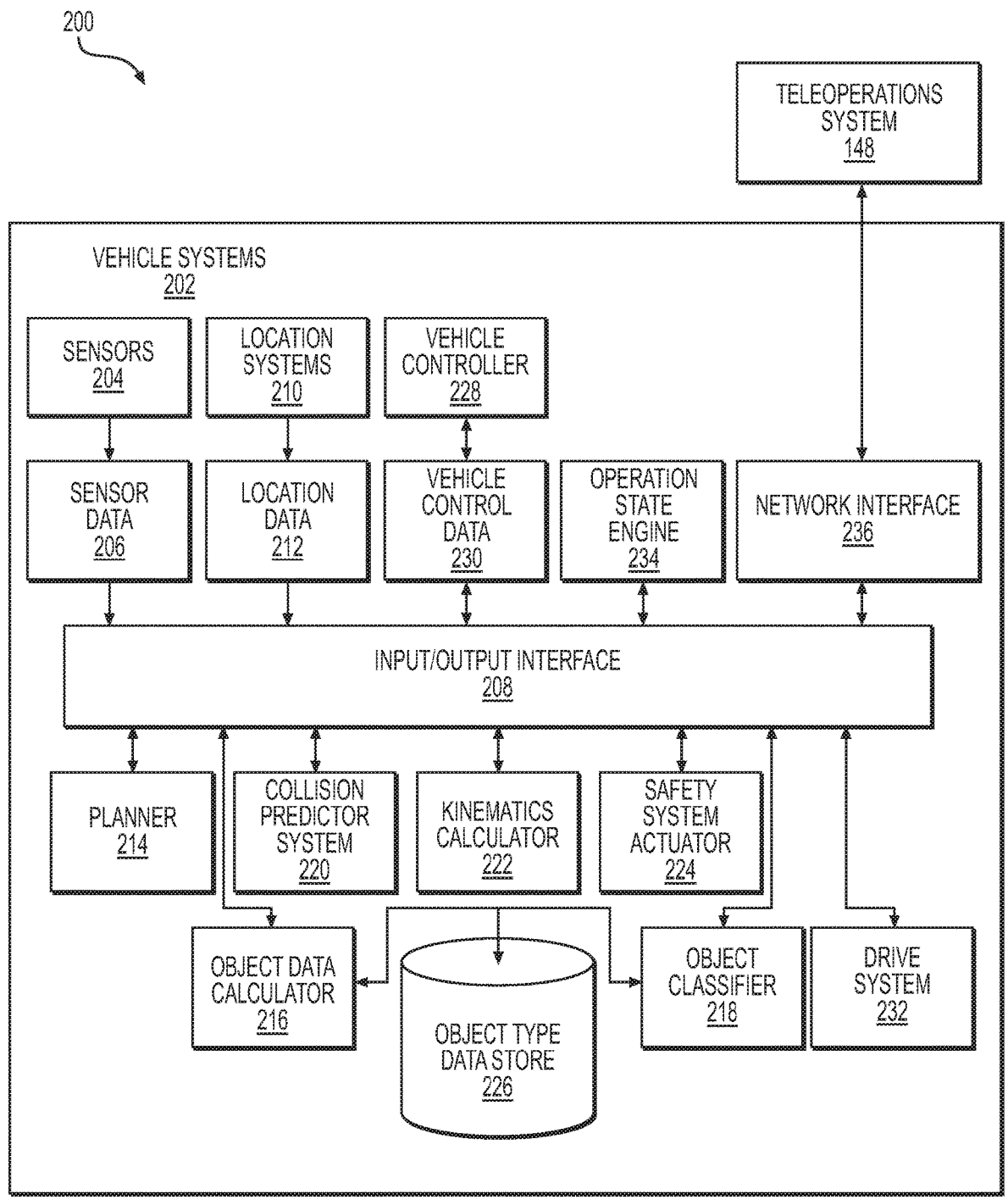
FIG. 2 is a block diagram including an example vehicle systems architecture and teleoperations system.

FIG. 2 is a block diagram of an example architecture 200 including a vehicle system 202 for controlling operation of the systems that provide data associated with operation of the vehicle 102, and that control operation of the vehicle 102.

In various implementations, the architecture 200 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 200 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 200 via an input/output ("I/O") interface 208. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface 208 may be configured to coordinate I/O traffic between the processor(s), the non-transitory computer readable media, and any peripheral devices, the network interface, or other peripheral interfaces, such as input/output devices. In some implementations, the I/O interface 208 may perform any necessary protocol, timing, or other data transformations to convert data signals from one component (e.g., the non-transitory computer readable media) into a format suitable for use by another component (e.g., processor(s)). In some implementations, the I/O interface 208 may include support for devices attached through various types of peripheral buses, such as a variant of the Peripheral Component Interconnect (PCI) bus standard or the Universal Serial Bus (USB) standard, for example. In some implementations, the function of the I/O interface 208 may be split into two or more separate components, such as a north bridge and a south bridge, for example. Also, in some implementations, some or all of the functionality of the I/O interface 208, such as an interface to the non-transitory computer readable media, may be incorporated directly into the processor(s).

In the example architecture 200 shown in FIG. 2, the example vehicle system 202 includes a plurality of sensors 204, for example, configured to sense movement of the vehicle 102 through the environment 100, sense environmental data (e.g., ambient temperature, pressure, and humidity), and/or sense conditions of an interior of the vehicle 102 (e.g., passenger count, interior temperature, noise level). In some examples, the sensors 204 may include sensors configured to identify a location on a map. The sensors 204 may include, for example, one or more light detection and ranging sensors (LIDAR), one or more cameras (e.g. RGB-cameras, intensity (grey scale) cameras, infrared cameras, depth cameras, stereo cameras, and the like), one or more radio detection and ranging sensors (RADAR), sound navigation and ranging (SONAR) sensors, one or more microphones for sensing sounds in the environment 100, such as sirens from law enforcement and emergency vehicles or for selectively noise-cancelling an interior of the vehicle 102, and other sensors related to the operation of the vehicle 102. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The sensors 204 may also include, for example, inertial measurement units (IMUs), accelerometers, and gyroscopes. The sensors 204 may be configured to provide sensor data 206 representative of the sensed objects and signals to the vehicle system 202 via, for example, an input/output (I/O) interface 208. Other types of sensors and sensor data are contemplated.

The example vehicle system 202 also includes location systems 210 configured to receive location information, including position and/or orientation data (e.g., a local position or local pose) from the sensors 204 and/or external sources, and provide location data 212 to other portions of the vehicle system 202 via the I/O interface 208. The external sources may include global satellites for facilitating operation of a global positioning system (GPS) and/or a wireless network for communicating and receiving information related to the vehicle's location, such as map data. The location systems 210 may also include sensors configured to assist with navigation of the vehicle 102, such as wheel encoders for sensing the rotation of the wheels 128, inertial navigation sensors, such as gyroscopes and/or accelerometers and/or magnetometers, and/or cameras for obtaining image data for visual odometry or visio-inertial navigation.

The example vehicle system 202 also includes one or more of a planner 214, an object data calculator 216, an object classifier 218, a collision predictor system 220, a kinematics calculator 222, a safety system actuator 224. The vehicle system 202 is configured to access one or more data stores including, but not limited to, an object type data store 226. The object type data store 226 may include data representing object types associated with object classifications for objects detected in the environment 100.

The example vehicle system 202 shown in FIG. 2 may also include a vehicle controller 228 configured to receive vehicle control data 230, and based on the vehicle control data 230, communicate with a drive system 232 (e.g., a steering system, a propulsion system, suspension system, and/or a braking system) to control operation of the vehicle 102. For example, the vehicle control data 230 may be derived from data received from one of more of the sensors 204 and one or more of the planner 214, the object data calculator 216, the object classifier 218, the collision predictor system 220, the kinematics calculator 222, and the safety system actuator 224, and control operation of the drive system 230, so that operation and maneuvering of the vehicle 126 is executed.

In some examples, the planner 214 may be configured to generate data representative of a trajectory of the vehicle 102, for example, using data representing a location of the vehicle 102 in the environment 100 and other data, such as local pose data, that may be included in the location data 212. In some examples, the planner 214 may also be configured to determine projected trajectories predicted to be executed by the vehicle 102. The planner 214 may, in some examples, be configured to calculate data associated with a predicted motion of an object in the environment 100, and may determine a predicted object path associated with the predicted motion of the object. In some examples, the object path may include the predicted object path. In some examples, the object path may include a predicted object trajectory. In some examples, the planner 214 may be configured to predict more than a single predicted object trajectory. For example, the planner 214 may be configured to predict multiple object trajectories based on, for example, probabilistic determinations or multi-modal distributions of predicted positions, trajectories, and/or velocities associated with an object.

In some examples, the object data calculator 216 may be configured to provide data representative of, for example, one or more of the pose (e.g. position and orientation) of an object in the environment 100 surrounding the vehicle 102, an object track associated with the object (e.g., a historic position, velocity, acceleration, and/or heading of the object over a period of time (e.g. 5 seconds)), and an object classification associated with the object (e.g. a pedestrian, a vehicle, a bicyclist, etc.). For example, the object data calculator 216 may be configured to receive data in the form of sensor signals received from one or more of the sensors 204 and determine data representing one or more of the position and/or orientation in the environment 100 of the object, the object track, and the object classification.

In some examples, the object classifier 218 may be configured to access data from the object type data store 226, which may be configured to store data representing object types, such as, for example, a species of an object classification, a subclass of an object classification, and/or a subset of an object classification. The object classifier 218, in some examples, may be configured to analyze object data generated by the object data calculator 216 representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional designations, subclasses, or subsets. For example, a "sedan" that is parked may have an additional designation of being "static" or being "dynamic" if moving or a "person" may have an additional subclass designation of "child," which may be associated with a further classification of "unpredictable." In some examples, such an object classifier may also determine a predicted object behavior based on one or more of a portion of the sensor data or the object type.

In some examples, the object classifier 218 can leverage detected objects to detect an event by accessing correlation instructions or correlated data in the object type data store 226. For example, if the object classifier 218 detects five objects labeled "person," three of which are further labeled "dynamic" and two "static;" five objects labeled "construction cone," and one object labeled "backhoe," then the object classifier 218 can detect an event labeled "construction zone" or "construction worker" and "hand-given instructions" (e.g., if a traffic flagger is present). In some examples, certain event labels and/or combinations of event labels and/or objects can be associated with an indication of low confidence (e.g., "unpredictable" label or low confidence level, whether the confidence level is calculated or is hard-code associated with the combination).

In some examples, a teleoperator elevation requirement can be associated with the event and/or combination. For example, a teleoperator elevation requirement can specify a "high elevation" that indicates that only teleoperations devices having elevated teleoperator credentials associated therewith are permitted to handle the request (e.g., the elevated teleoperator credentials could indicate a senior teleoperator or a more advance or specially trained artificial intelligence). In some examples, a teleoperator elevation requirement can specify that a teleoperator response to the request for assistance must be confirmed by one or more additional teleoperation device and/or that the request is to be disseminated to more than one teleoperations device (e.g., because of a highly complex event or the involvement of multiple vehicles requiring guidance in concert).

In some examples, the collision predictor system 220 may be configured to use the data representing the object type, the predicted object behavior, the data representing the track of the object, and/or the data representing the trajectory of the vehicle 102, to predict a collision between the vehicle 102 and the object. In some examples, the collision predictor system 220 may be used to predict a collision between the vehicle 102 and an object in the environment 100 based on the object type, whether the object is moving, the trajectory of the vehicle 102, the predicted path of the object obtained from the planner 214. For example, a collision may be predicted based in part on the object type due to the object moving, the trajectory of the object being in potential conflict with the trajectory of the vehicle 102, and the object having an object classification that indicates the object is a likely collision threat.

In some examples, the kinematics calculator 222 may be configured to determine data representing one or more scalar and/or vector quantities associated with motion of objects in the environment 100, including, but not limited to, velocity, speed, acceleration, momentum, local pose, and/or force. Data from the kinematics calculator 222 may be used to compute other data, including, but not limited to, data representing an estimated time to impact between an object and the vehicle 102, and data representing a distance between the object and the vehicle 102. In some examples, the kinematics calculator 222 may be configured to predict a likelihood that other objects in the environment 100 (e.g., cars, motorcyclists, pedestrians, cyclists, and animals) are moving in an alert or controlled state, versus an un-alert or uncontrolled state.

In some examples, the planner 214 may use data produced by the kinematics calculator 222 to estimate predicted object data. For example, the planner 214 may use current scalar and/or vector quantities associated with object to determine a probability that other objects are moving as though they are being controlled and/or are behaving in a predictable manner, or whether they are not being controlled and/or behaving in an unpredictable manner, for example, by observing motion of the object over time and relative to other objects in the environment 100. For example, if the objects are moving erratically or without appearing to adjust to the presence or motion of other objects in the environment 100, this may be an indication that the objects are either uncontrolled or moving in an unpredictable manner. This may be inferred based on sensor data received over time that may be used to estimate or predict a future location of the object relative to a current or future trajectory of the vehicle 102.

In some examples, the safety system actuator 224 may be configured to activate one or more safety systems of the autonomous vehicle 102 when a collision is predicted by the collision predictor 220 and/or the occurrence of other safety related events, such as, for example, an emergency maneuver by the vehicle 102, such as hard braking or a sharp acceleration. The safety system actuator 224 may be configured to activate an interior safety system (e.g., including seat belt pre-tensioners and/or air bags), an exterior safety system (e.g., including warning sounds and/or warning lights), the drive system 232 configured to execute an emergency maneuver to avoid a collision and/or a maneuver to come to a safe stop, and/or any combination thereof. For example, the drive system 232 may receive data for causing a steering system of the vehicle 102 to change the travel direction of the vehicle 102, and a propulsion system of the vehicle 102 to change the speed of the vehicle 102 to alter the trajectory of vehicle 102 from an initial trajectory to a trajectory for avoiding a collision.

The vehicle system 202 may operate according to the following example. Data representing a trajectory of the vehicle 102 in the environment 100 may be received by the vehicle controller 228. Object data associated with an object in the environment 100 surrounding the vehicle 102 may be calculated. Sensor data 206 from one or more of the sensors 204 may be used to calculate the object data. The object data may include data representing the location of the object in the environment 100, an object track associated with the object, such as whether the object is stationary or moving, and an object classification associated with the object, such as whether the object is another vehicle, a pedestrian, a cyclist, an animal, or a stationary object. In some examples, the object data calculator 216, based on the object data, may be used to determine data representing the object's location in the environment 100, data representing whether the object is moving, and data representing a classification associated with the object.

In some examples, the planner 214 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

The example vehicle system 202 may also include an operation state engine 234. In some examples, the object data calculator 216, the object classifier 218, the collision predictor system 220, the kinematics calculator 222, and/or the object type data store 226 may each generate values for use by the operation state engine 234 to determine a confidence level associated with operation of the vehicle 102. For example, the values generated by the other systems of the vehicle system 202 can include weights and/or values used by the operation state engine 234 to calculate a Bayesian probability signifying a degree of belief that the vehicle 102 is operating correctly (e.g., safely, according to the traffic laws, comfortably, according to a policy stored at or accessible to the vehicle system).

In some examples, the operation state engine 234 can correlate the data generated by the other systems or use it to conduct an inference to produce data such as the event identifiers or a priority associated with an event. For example, the operation state engine 234 can leverage the data captured and generated by the other systems to determine a criticality of the event, such as by calculating a Bayesian probability, similarly to the confidence level. This criticality can be used to assign a priority to a request for assistance, as further discussed herein. This priority can be used by a teleoperations device to determine which of a plurality teleoperations devices to assign the request or in choosing a configuration of the user interface in presenting data associated with the request. In some examples, the operation state engine 234 may reside within the teleoperations system 148. In such an example, determination of the criticality and/or priority may be determined by a teleoperator device after receiving one or more of sensor data 206, an object type, a collision prediction, etc. via the network interface 236.

In some examples, the operation state engine 234 can be configured, in part, as a database and/or a model such as, for example, a finite state machine ("FSM"), such as a deterministic finite automaton ("DFA"), for example; an artificial neural network ("ANN"); and/or a directed acyclic graph ("DAG") (e.g., where the nodes are organized as a Bayesian network). In some examples, this model can be used to determine correlated data (e.g., an event correlated with a combination of object data; a confidence level correlated with an event, a combination of object data, and sensor data; a priority correlated with an event and object data; an identification of a combination of operation state data and/or sensor data to transmit with a request for assistance). For example, the model could output a binned confidence level (e.g., "high confidence," "operable confidence," or "low confidence," or "predictable," or "unpredictable"), Bayesian weights so that a system-significant value could be derived (e.g., 80%), and/or a system-significant value could itself be output (e.g., 80%). In some examples, the model can be used additionally or alternatively to determine an event from sensor data and/or object data, a priority associated with an event, and/or an identification of a subset of operation state data and/or sensor data to transmit with a request for assistance.

In an example implementing a FSM, for example, the FSM can include a plurality of states where a state includes a permutation of data collected, received, or generated by the other systems. An individual state can have associated therewith correlated data. In some examples, the operation state engine 234 can obtain data from any one or more of the other systems and can format it in the same manner as states of a DFA and identify whether the DFA contains a matching state and correlated information or an operation to perform associated therewith (e.g., confidence level, event, priority, whether to send a request for assistance, etc.). In some examples, whatever model is chosen for the operation state engine 234, the model can be configured to obtain data from one or more of the other systems to determine correlated data (e.g., pushing the data through a DAG configured as a Bayesian network, input the data into an ANN).

In some examples, the operation state engine 234 can amalgamate operation state data from the data it obtains and/or from the correlated data it determines. For example, the operation state data may include:
- a representation of sensor data;
- detected object/event data that includes:
  - a location of a detected object,
  - a track of the detected object (e.g., a position, velocity, acceleration, and/or heading of the object),
  - a classification (e.g., a label) of the detected object (for example, including sub-classes and subsets of classifications as discussed above),
  - an identifier of a detected event,
  - a confidence level (e.g., a percentage, an indicator that a classification and/or an identifier of a detected event is associated with an indicator of high unpredictability or low confidence),
  - a rate of change of confidence levels over time, and/or
  - a priority associated with the object(s) and/or event;
- path planning data that includes:
  - a route,
  - a progress of the vehicle 102 along the route,
  - a mission type (e.g., stop for additional passengers, pick up and deliver one passenger),
  - passenger input,
  - a trajectory,
  - a pose of the vehicle 102,
  - a geographic location of the driverless vehicle, and/or
  - and/or a trajectory determined by the vehicle 102;
- vehicle state information that includes:
  - a number of passengers occupying the vehicle 102,
  - passenger input (e.g., speech, passenger state),
  - an indication of vehicle and/or sensor health,
  - an indication of vehicle history (e.g., past routes, past requests for assistance, past maintenance),
  - a charge level of a battery of the vehicle 102,
  - a distance of the vehicle 102 from a fleet base,
  - an indication of whether a communication session is open between the vehicle 102 and a teleoperator device(s) and/or another vehicle,
  - vehicle control data,
  - a vehicle type,
  - road network data (e.g., data related to a global or local map of an area associated with operation of the vehicle 102 such as, for example, a location of the vehicle within a local map and/or an indication of whether vehicle data is normative for the location (e.g., whether a vehicle speed is above or below a speed limit indicated by the road network data, whether the vehicle is stopped at a position that is identified as being a stop location, whether the vehicle is within a predefined distance of a fleet-wide event)),
  - communication channel information (e.g., bandwidth and/or quality of connection, identification of device(s) to which the vehicle 102 is connected, predicted communication channel degradation), and/or
  - previous teleoperator guidance to the vehicle 102 (e.g., direct instruction, collaboration, and/or confirmation);
- environmental data (e.g., in some examples this may be included in the representation of the sensor data or it may be acquired via the network interface) that includes:
  - traffic information,
  - weather information,
  - city/regional events (e.g., acquired from social media, publications),
  - time of day, and/or
  - road network data (e.g., a processor-executable map accessible to the vehicle 102 that identifies geographical locations as being a normal driving area, a drivable area, speed limits associated with geographical regions, event locations (e.g., accident location, location from which multiple requests have been sent), and/or an undriveable area and/or containing operating policies for a vehicle to operate therein).

In some examples, the planner 214 may use at least a portion of the sensor data and/or the operation state data to determine a next action of the vehicle 102 such as, for example, a trajectory and/or whether to send a request for assistance.

As shown in FIG. 2, the example vehicle system 202 also includes a network interface 236 configured to establish a communication link between the vehicle 102 and one or more other devices. For example, the network interface 236 may be configured to allow data to be exchanged between the vehicle 102, other devices coupled to a network, such as other computer systems, other vehicles 102 in the fleet of vehicles, and/or with the teleoperations system 148. For example, the network interface 236 may enable wireless communication between numerous vehicles and/or the teleoperations system(s) 148. In various implementations, the network interface 236 may support communication via wireless general data networks, such as a Wi-Fi network. For example, the network interface 236 may support communication via telecommunications networks, such as, for example, cellular communication networks, satellite networks, and the like.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 200 is merely illustrative and is not intended to limit the scope of the present disclosure. In particular, the computing system and devices may include any combination of hardware or software that may perform the indicated functions, including computers, network devices, internet appliances, tablet computers, PDAs, wireless phones, pagers, etc. The architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 200 may be transmitted to the architecture 200 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 3:
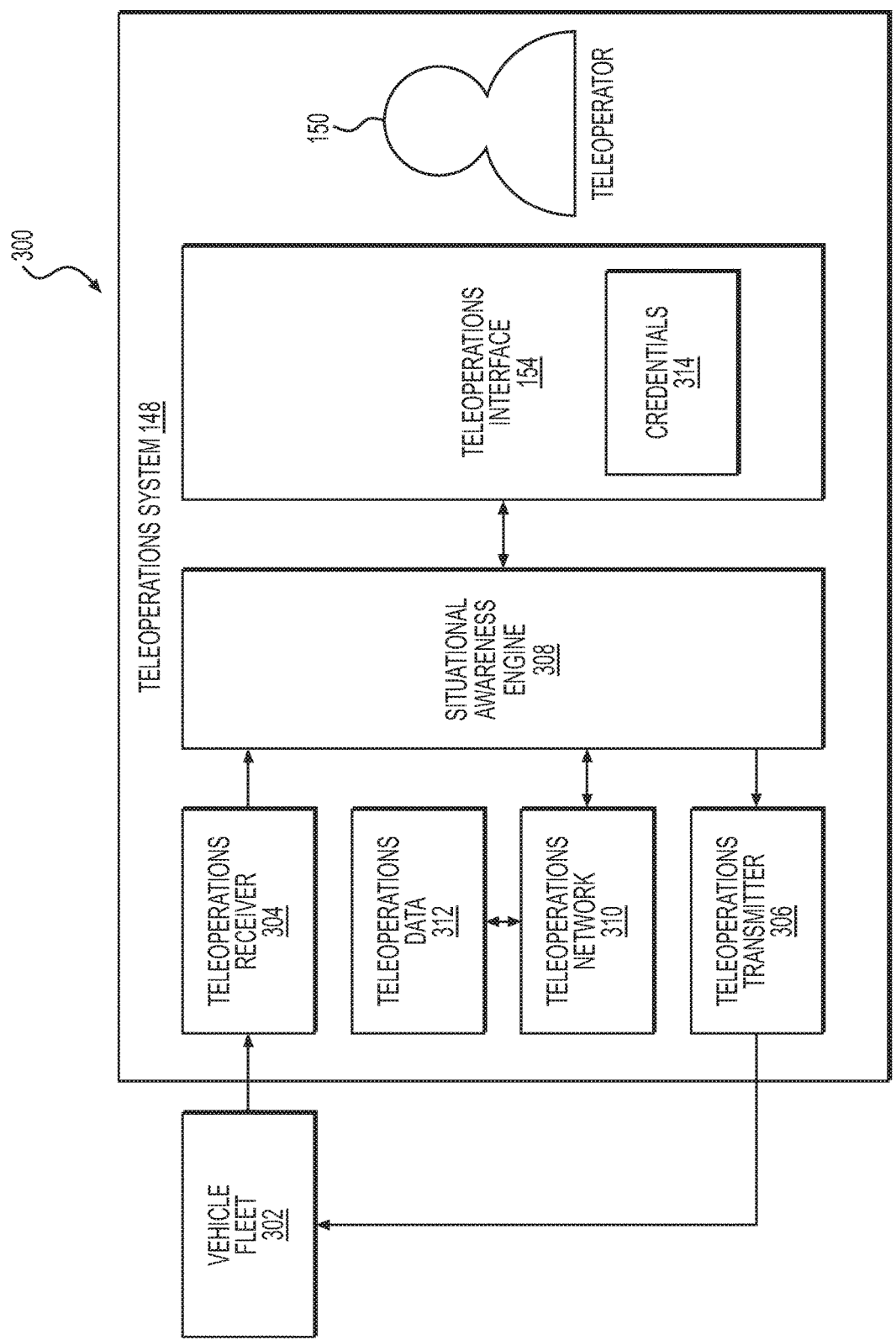
FIG. 3 is a block diagram of an example teleoperations system architecture.

FIG. 3 shows an example architecture 300 including a vehicle fleet 302 and an example teleoperations system 148. The example vehicle fleet 302 includes one or more vehicles 102, at least some which are communicatively coupled to the teleoperations system 148 via the respective network interfaces 236 of the vehicles 102. A teleoperations receiver 304 and a teleoperations transmitter 306 associated with the teleoperations system 148 may be communicatively coupled to the respective network interfaces 236 of the vehicles 102. For example, a vehicle 102 may send communication signals via the network interface 236, which are received by the teleoperations receiver 304. In some examples, the communication signals may include, for example, a request for assistance, sensor data from sensor signals generated by one or more sensors associated with the vehicle 102, and/or operation state data, though any data and/or output from one or more modules of the vehicle systems 202 is contemplated. In some examples, the sensor data may include raw sensor data and/or processed sensor data, such as a subset of operation state data such as a representation of the sensor data (e.g. a bounding box), as discussed above. In some examples, the communication signals may include a subset of the operation state data discussed above. In some examples, the communication signals from the vehicle 102 may include a request for assistance to the teleoperations system 148.

As shown in FIG. 3, a situational awareness engine ("SAE") 308 may obtain the communication signals from the vehicle 102 and relay at least a subset of them to the teleoperations interface 154. The SAE 308 may additionally or alternatively obtain signals generated via the teleoperations interface 154 and relay them to a teleoperations network 310 and/or transmit at least a subset of them to one or more vehicles of the vehicle fleet 302 via the teleoperations transmitter 306. The SAE 308 may additionally or alternatively obtain signals from a teleoperations network 310 and relay at least a subset of them to the teleoperations interface 154 and/or the teleoperations transmitter 306. In some examples, the teleoperations interface 154 may directly communicate with the vehicle fleet 302.

In some examples, the SAE 308 can be implemented on a device that is separate from a device that includes the teleoperations interface 154. For example, the SAE 308 can include a gateway device and an application programming interface ("API") or similar interface. In some examples, the SAE 308 includes an application interface and/or a model, such as, for example, a FSM, an ANN, and/or a DAG. In some examples, the SAE 308 is configured to determine a presentation configuration of data received from one or more elements discussed herein (e.g., a vehicle 102, fleet data from the fleet 302, and/or other teleoperations interfaces) and/or input options to present to the teleoperator to provide guidance to one or more vehicles (e.g., an option to select a displayed button that confirms a trajectory determined by the vehicle). The configuration of the SAE 308 is discussed in more detail below in relation to FIG. 5.

In some examples, the teleoperations receiver 304 may be communicatively coupled to the teleoperations interface 154 via the SAE 308, and in some examples, the teleoperator 150 may be able to access the sensor data, the operation state data, and/or any other data in the communication signals received from a vehicle 102 via the teleoperations interface 154. In some examples, the teleoperator 150 may be able to selectively access the sensor data, operation state data, and/or other data via the input device 158, and view the selected data via one or more of the displays 156 (and/or 406) (see FIGS. 1 and 4). In some examples, such selective accessing can include transmitting a request for data from a vehicle via the teleoperations transmitter 306. In some examples, the SAE 308 may present a subset or representation of the data to the teleoperator 150 via the teleoperations interface 154. As a non-limiting example, the SAE 308 may create simplistic pictorial representations, bounding boxes, arrows indicating a bearing and velocity of objects, icons representing objects, colorization of the sensor data, or other representations of the data which may simplify interpretation by a teleoperator 150.

In the example shown, the teleoperations system 148 also includes a teleoperations network 310 configured to provide communication between two or more of the teleoperations interfaces 154 and the respective teleoperators 150, and/or communication with teleoperations data 312. For example, the teleoperations system 148 may include a plurality of teleoperations interfaces 154 and respective teleoperators 150, and the teleoperators 150 may communicate with one another via the teleoperations network 310 to facilitate and/or coordinate the guidance provided to the vehicles 102 of the vehicle fleet 302. In some examples, there may be a teleoperator 150 assigned to each of the vehicles 102, and in some examples, a teleoperator 150 may be assigned to more than a single vehicle 102 of the vehicle fleet 302. In some examples, more than one teleoperator 150 may be assigned to a single vehicle 102. In some examples, teleoperators 150 may not be assigned to specific vehicles 102 of the vehicle fleet 302, but may instead provide guidance to vehicles 102 that have encountered certain types of events and/or to vehicles 102 based on, for example, a level of urgency associated with the vehicle's encounter with the event. In some examples, data associated with an event and/or the guidance provided by a teleoperator 150 may be stored by the teleoperations system 148, for example, in storage for the teleoperations data 312, and/or accessed by other teleoperators 150.

In some examples, the teleoperation data 312 may be accessible by the teleoperators 150, for example, via the teleoperations interface 154, for use in providing guidance to the vehicles 102. For example, the teleoperations data 312 may include global and/or local map data related to the road network 104, events associated with the road network 104, and/or travel conditions associated with the road network 104 due to, for example, traffic volume, weather conditions, construction zones, and/or special events. In some examples, the teleoperations data 312 may include data associated with one more of the vehicles 102 of the vehicle fleet 302, such as, for example, maintenance and service information, and/or operational history including, for example, event history associated with the vehicle 102, route histories, occupancy histories, and other types of data associated with the vehicle 102.

In some examples, a teleoperator 150 and/or a teleoperations interface 154 can be associated with credentials 314. For example, to activate a session at the teleoperations interface 154, the teleoperations system 148 may require the teleoperator 150 to authenticate using the credentials 314. In some examples, the credentials 314 may be inherent to the particular teleoperations interface 154. In some examples, requests for assistance with a particular permutation of operation state data (e.g., certain events) and/or a particular teleoperation option may require resolution by a teleoperations interface 154 having elevated credentials 314 (e.g., credentials with greater permissions). For example, if a teleoperator 150 selects an action at a teleoperations interface 154 that would affect the entire vehicle fleet 302 instead of just one vehicle, the action could be transmitted to a second teleoperations interface 154 that has elevated credentials associated therewith for confirmation, modification, and/or rejection. A request and/or operation state data associated with an elevated level of credentials can be used to determine a teleoperations interface 154 to which to relay the request. In some examples, the SAE 308 can relay a request and/or operation state data associated with an elevated level of credentials to multiple teleoperations interfaces 154 instead of a single teleoperations interface 154.

In some examples, more than one teleoperator 150 may be required to confirm an event and/or resolution of the event. As a non-limiting example, consider an event in which sensors are somewhat obscured from a single vehicle 102 such that a teleoperator 150 is unable to propose a resolution to the event, such that a corresponding trajectory has a high enough confidence level. In such an example, the teleoperations system 148 may require one or more additional teleoperators 150 to confirm the event and/or provide the same resolution of the event, regardless of credential level.

Example Instance of Teleoperation Interface(s)

Figure 4:
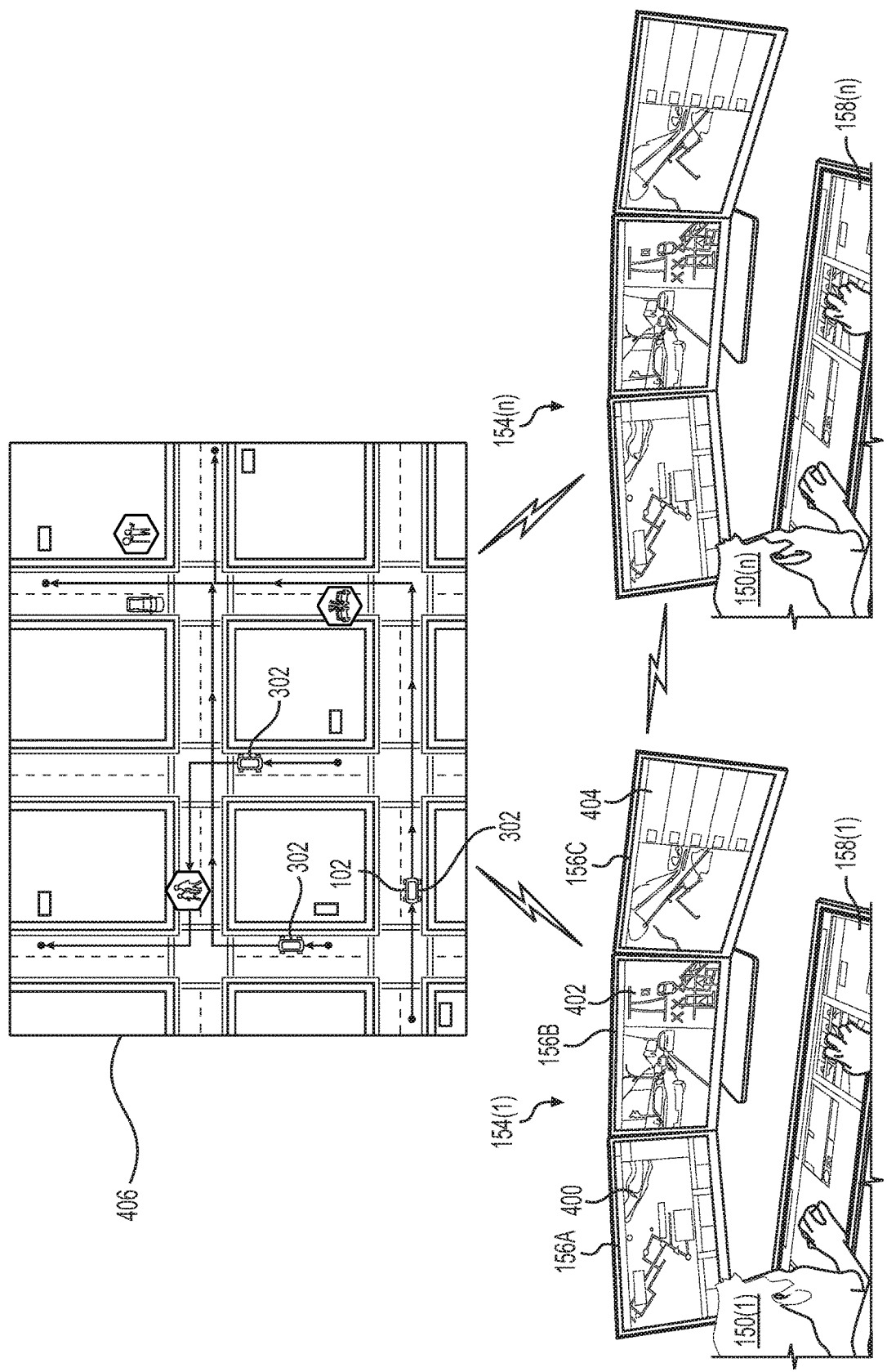
FIG. 4 is a schematic perspective view of example teleoperations interfaces.

FIG. 4 shows example teleoperations interface(s) 154(1)-154(n). Example teleoperations interface 154(1) includes three displays 156A, 156B, and 156C configured to provide the teleoperator 150 with data related to operation of at least one vehicle 102 of the vehicle fleet 302. In some examples, the teleoperations interfaces 154(1) and 154(n) can further include a fleet interface 406 that displays information relevant to the vehicle fleet 302 and/or can display common data for an event/request being handled by multiple teleoperators (e.g., teleoperators 150(1) and (n)).

In some examples, the SAE 308 determines the content and/or content form presented at teleoperations interface 154(1) and how it is presented (i.e., the configuration of the presented data). For example, the SAE 308 may determine a subset of the communication signals received from one or more vehicles of the fleet 302, sensor data received from one or more vehicles of the fleet 302, operation state data received from one or more vehicles of the fleet 302, and/or data obtained from the teleoperations network 308 (e.g., information regarding the fleet, conditions affecting the fleet, and/or teleoperations system status data). In some examples, such content may be presented as cartoon or pictorial representations, colorization of sensor data, abstractions of sensor data (e.g. bounding boxes), or the like so that information may be readily apparent regarding an event.

In some examples, the SAE 308 may determine different displays 156 to show different information related to one or more of the vehicles of the fleet 302. This can be determined by a model of the SAE 308 configured to expedite situational awareness and guidance response, as discussed in more detail below. For example, the SAE 308 may determine to cause display an overhead map view 400 of a geographic area in which a vehicle 102 is travelling on display 156A. In some examples, the map view 400 may be supplemented with information related to or received from a vehicle 102 (e.g., a subset of the sensor and/or operation state data determined by the SAE 308) and/or other vehicles of the fleet 302 regarding conditions in the geographic area shown in the map view 400. In some examples, the SAE 308 may cause the map view 400 to take the form of a split-screen view, for example, with one portion of the display 156A showing the overhead map view and another portion of the display 156A showing, for example, status-related data for a subset of the vehicle fleet 302 being monitored by the teleoperator 150 associated with the teleoperator interface 154. Other types of views are contemplated.

In some examples, the SAE 308 may cause display by the display 156B of a situation view 402 that depicts, for example, a view from the perspective of the vehicle 102.

Such a view may provide the teleoperator 150 with a relatively more intuitive view of a situation or event being experienced by the vehicle 102. In some examples, the situation view 402 can include one or more of a live (real-time) video feed and a live sensor view providing a depiction of objects and surroundings sensed by the sensors of the vehicle 102. In some examples, the sensor view may provide the teleoperator 150 with information related to whether the sensors are detecting all of the relevant objects in the surroundings. In some examples, the situation view 402 may take the form of a split-screen view with one portion of the display 156B showing a live video feed and another portion of the display 156B showing a live sensor view. Other types of views and/or representations (e.g. those described herein) are contemplated.

The SAE 308 may cause display by the display 156C a fleet view 404 that depicts, for example, an overhead map view showing the locations of one or more vehicles 102 of the vehicle fleet 302 and other information related to the status of the vehicle fleet 302 and/or the geographic area shown, such as, for example, traffic-related information and/or event-related information. In some examples, the fleet view 404 may show the origins, destinations, and/or paths for one or more of the vehicles 102 of the vehicle fleet 302. In some examples, the fleet view 404 may take the form of a split-screen view, for example, with one portion of the display 156C showing the overhead map view and another portion of the display 156C showing, for example, status-related data for a subset of the vehicle fleet 302 being monitored by the teleoperator 150 associated with the teleoperator interface 154. In some examples, the fleet view 404 may additionally or alternatively be represented at an additional display 406 that is accessible to multiple teleoperators 150. In some examples, the fleet view 404 on the additional display 406 may vary from the fleet view display 156C. In some examples, when multiple teleoperators 150 are coordinating guidance to a common set of one or more vehicles, the fleet view 404 can be exchanged for any of the other views discussed herein.

In the example illustrated in FIG. 4, the additional display 406 displays a schematic overhead view of an example road network including three example vehicles en route between respective geographic locations and respective destinations at second geographic areas. As an example, if one vehicle of the three vehicles were to generate a request the additional display 406 could display this schematic overhead view. In some examples, depending on teleoperator preoccupation, data corresponding to one or more of the three vehicles could be reproduced at teleoperations interface(s) 150(1)-(n). For example, each respective vehicle of the three vehicles could be assigned to one of three teleoperations interfaces (1:1 vehicle to teleoperator ratio), one vehicle could be assigned to multiple teleoperations interfaces (1:n vehicle to teleoperator ratio—implemented in complex situations requiring simultaneous monitoring of multiple sensor streams, for example), and/or multiple vehicles could be assigned to a single teleoperations interface (m:1 teleoperator ratio—implemented in more simple coordination of the vehicles, for example). In some examples, the additional display 406 may display information related to coordination attempts between teleoperators and/or fleet-wide data such as city activities, weather, or vehicle availability/downtime. In some examples, it may be advantageous to have a number, m, of teleoperators control a number, n, of vehicles in the fleet (i.e. m:n teleoperator to vehicle). For example, it may be necessary to have confirmation by three teleoperators to verify a response to an event, but those three teleoperators can control ten vehicles.

Although the displays 156A, 156B, 156C, and 406 are described in a manner that suggests they may be separate displays 156, they may be integrated into a single display 156, or may include fewer or more displays 156. In some examples, the displays 156 may be reconfigurable to show different information, information in different formats, information in different arrangements, and/or information at a different level of detail. For example, the information displayed and/or the arrangement of the information displayed may be tailored by the teleoperator 150 associated with the teleoperator interface 154. In some examples, the teleoperations system 148 may be configured to automatically show the displayed information according to default settings that provide, for example, the most useful information in the most intuitive arrangement and/or level of detail based on, for example, the situation and/or status associated with a vehicle 102 for which guidance from the teleoperator 150 is most urgently needed. In some examples, the SAE 308 may temporarily modify preferences set by the teleoperator 150 based on a determination by the SAE 308.

In addition, the example teleoperator interface 154 shown in FIG. 4 also includes a teleoperator input device 158 configured to allow the teleoperator 150 to provide information to one or more of the vehicles 102, for example, in the form of teleoperations signals providing guidance to the vehicles 102. The teleoperator input device 158 may include one or more of a touch-sensitive screen, a stylus, a mouse, a dial, a keypad, and/or a gesture-input system configured to translate gestures performed by the teleoperator 150 into input commands for the teleoperator interface 154. In some examples, the input device 158 may include a split-screen providing different touch-sensitive areas that the teleoperator 150 may use to provide different types of information to a vehicle 102. For example, the different areas of the split-screen may provide the teleoperator 150 with different types of information and may facilitate the teleoperator's ability to provide instructions to the vehicle 102, collaborate with the vehicle 102, and/or confirm information and/or proposed actions to be executed by the vehicle 102. For example, the SAE 308 may determine one portion of the input device 158 to provide a menu of different vehicles 102 of the vehicle fleet 302 to facilitate the teleoperator's selection of a vehicle 102 for which to provide guidance. The SAE 308 may additionally or alternatively determine portions of the input device 158 that may include interactive displays and/or options for providing guidance to a selected vehicle 102, as explained in more detail herein.

In some examples, when a request for assistance is received from a vehicle 102, a default action can be to notify a teleoperator 150 assigned to the vehicle 102. Additionally, or alternatively, the SAE 308 may determine (1) a number of teleoperations interface(s) 154 to which to disseminate the request and/or data associated with the request, (2) the particular teleoperations interface(s) 154 to which to disseminate the request and/or data associated with the request, and/or (3) a subset of data to relay and/or request from the vehicle 102 and/or the fleet 302 to relay to the teleoperations interface(s) 154. For example, the SAE 308 may determine to transmit a request from a vehicle 102 and/or the data associated with the request to one teleoperations interface 154 or multiple teleoperations interfaces 154 (i.e., for coordinated guidance of the single vehicle). In further examples, the SAE 308 may determine to transmit a request associated with an event associated with multiple vehicles to one teleoperations interface 154 or multiple teleoperations interfaces 154 (e.g., where single and/or multiple teleoperations interfaces 154 can be assigned to respective vehicles).

In some examples, when multiple teleoperators 150 are coordinating guidance to a common set of one or more vehicles, the fleet view 404 can be exchanged for any of the other views discussed herein, and/or the teleoperations interfaces 154 of the multiples teleoperators 150 may be modified to present a respective portion of the data associated with the request to which the respective teleoperator is assigned. For example, in a particularly complex situation, one teleoperations interface 154 may present a front camera video and audio captured by an external microphone, a second teleoperations interface 154 may present an interior camera video and audio captured by an internal microphone, and a third teleoperations interface 154 may present a three-dimensional representation and fleet data. In some examples, the options presented to the teleoperators 150 to provide guidance to the vehicle 102 may vary accordingly. For example, first teleoperations interface 154 may display an option to activate an external speaker and/or to sound a horn of the vehicle 102, the second teleoperations interface 154 may display an option to activate an internal speaker and/or adjust controls modifying conditions of the interior of the vehicle, and the third teleoperations interface 154 may display options to modify fleet-wide parameters.

Figure 5A:
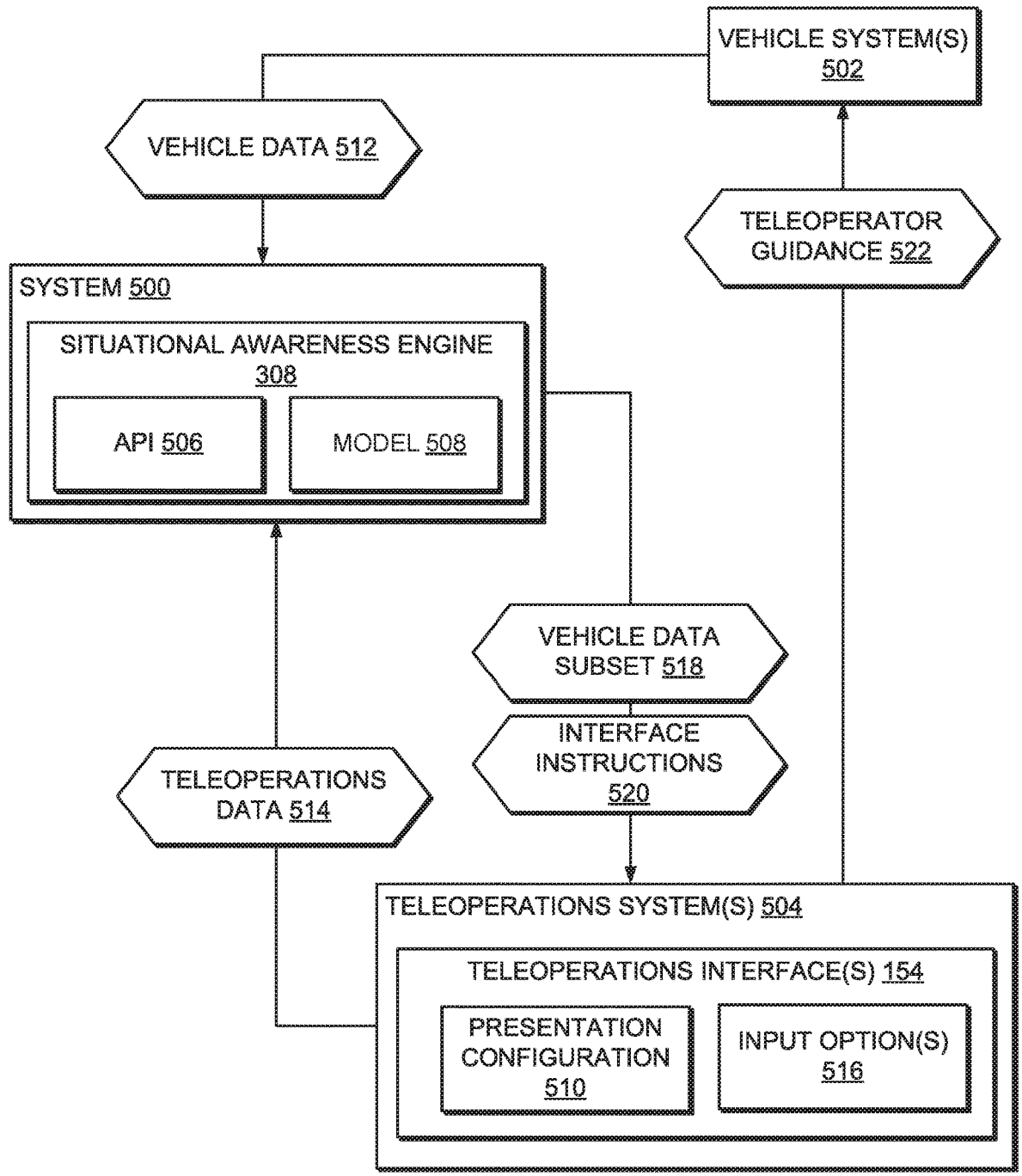
FIG. 5A is a block diagram of an example system architecture implementing a situational awareness engine.

FIG. 5A illustrates a block diagram of an example system architecture 500 implementing a situational awareness engine ("SAE") 308. In some examples, the example system architecture 500 can be included in vehicle system(s) 502, which can represent the vehicle 102 and/or the vehicle fleet 302; teleoperations system(s) 504, which can represent teleoperations system(s) 148; and/or a stand-alone device such as a gateway device of the teleoperations system 148.

Regardless of where it is located, the example system architecture 500 includes a SAE 308 that includes a software and/or hardware layer. This software and/or hardware layer may include an application programming interface ("API") 506 or similar interface and/or a model 508, such as, for example, a FSM (finite state machine), an ANN (artificial neural network), and/or a DAG (directed acyclic graph).

In some examples, the SAE 308 is configured to determine a presentation configuration 510 of vehicle data 512 obtained from vehicle system(s) 502 and/or teleoperations data 514 obtained from teleoperations system(s) 504 to be presented via teleoperations interface(s) 154, as discussed herein. The SAE 308 may also be configured to determine one or more input options 516 to present to via teleoperations interface(s) 154 for teleoperator(s) to provide guidance to one or more vehicles (e.g., an option to select a displayed button that confirms a trajectory determined by the vehicle). In some examples, the vehicle data 512 may include at least a portion of sensor and/or operation state data captured and/or generated by a vehicle 102, as discussed above.

In some examples, the SAE 308 may include a software and/or hardware layer configured to determine a presentation configuration 510 for apprising the teleoperator 150 of the situation at the vehicle 102. For example, when the SAE 308 obtains vehicle data 512 (e.g., sensor and/or operation state data of one or more vehicles and/or a request for assistance) the SAE 308 can determine a presentation configuration 510 and a subset of sensor data (or a representation thereof) and/or operation state data (vehicle data subset 518) to relay/cause to be presented at teleoperations interface(s) 154. The SAE 308 may also transmit interface instructions 520 for the teleoperations interface(s) 154 to correctly display the vehicle data subset 418 and/or to provide further instruction such as, for example, overriding teleoperator display preferences. In some examples, the SAE 308 may be trained or configured to determine a presentation configuration for a permutation of sensor and/or operation state data that will bring the teleoperator 150 to a sufficient awareness of the situation to provide guidance more rapidly than other permutations of presentation configurations.

For example, for a request for assistance related to an event that involves a dog wandering into the road, the SAE 308 may relay video and audio obtained from a front-facing camera of the vehicle 102 and instructions to display the video on a primary display (e.g., center and/or larger portion of a display, see 622 (FIG. 6A)) and play the audio via speakers of a teleoperations interface 154, even though a three-dimensional representation of the situation may be more common for other situations, for example. However, in an event where LIDAR of the vehicle 102 has identified objects that are occluded from a camera's view, the SAE 308 may relay LIDAR data and a still image taken from of a video obtained from the vehicle 102 along with instructions to render a three-dimensional representation of the scene from the LIDAR data on a primary display and include the still image on a secondary display (e.g., a peripheral and/or smaller portion of a display, see 628). Note that in both examples, the vehicle data 512 can include more data than is relayed to the teleoperations system(s) 504, SAE 308 may request the vehicle data subset 518 from the vehicle 102 alternatively or additionally to deriving the vehicle data subset 518 from the vehicle data 512. For example, in the example above where a portion of the vehicle data subset 518 is a still image, the SAE 308 may request a still image from a camera of the vehicle system 502, and/or the SAE 308 may create a still image from a video received in the vehicle data 512.

In some examples, a presentation configuration can result in a "view" on a display, audio reproduction, and/or tactile stimulation of the teleoperator 150 (e.g., to "shoulder tap" to draw attention to a certain monitor), for example, although any suitable user interface that enables the teleoperator 150 to come to an awareness of the situation at the vehicle 102 can be used.

Additionally, or alternatively, the SAE 308 may include a software and/or hardware layer configured to determine input option(s) 516 available for selection by the teleoperator 150 to provide teleoperator guidance 522 to the vehicle 102. For example, the SAE 308 can determine at least one option among a plurality of options to present to the teleoperator 150. In some examples, the teleoperator 150 may be able to access more than the at least one option, but the option determined by the SAE 308 may be presented in a primary presentation of a user interface such as, for example, a displayed option in a user interface, whereas the other options accessible to the teleoperator 150 may be accessed through a menu or in another manner that requires further action on the part of the teleoperator 150, such as gesturing, clicking, etc. In some examples, the input option(s) 516 to be presented and the manner in which they are presented (e.g., audio, location and size on a display, overlay on display) are determined by the interface instructions 520 sent from the SAE 308 to the teleoperations interface(s) 154.

For example, the input option(s) 516 may include one or more of a direct instruction (e.g., instructions commanding the vehicle 102 to perform a particular operation), collaborative instruction (e.g., modifying or creating operation state data for use by the driverless vehicle 102 to determine an operation of the driverless vehicle 102, revising an operation parameter of the vehicle 102, such as relaxing a driving corridor of the vehicle 102, so that the vehicle 102 can determine a trajectory within the newly relaxed driving corridor that circumnavigates an object), and/or confirmation (e.g., confirming a determination made by the vehicle 102). For example, depending on a permutation of the vehicle data 512 obtained by the SAE 308, the SAE 308 may determine one or more input option(s) 516 to be presented via the teleoperations interface(s) 154 from among a plurality of instructions such as, for example:

a command including one or more of:
- a trajectory for the vehicle 102,
- activating a horn of the vehicle 102,
- a modification to the driveline of the vehicle 102,
- turning on hazard lights of the vehicle 102,
- flashing lights of the vehicle 102,
- holding the vehicle 102 in position,
- inching the vehicle 102 forward,
- pulling the vehicle 102 over,
- using an external and/or internal speaker,
- opening one or more doors of the vehicle, or
- a reverse and/or forward nudge;

a collaborative instruction including one or more of:
- modifying a route of the vehicle 102,
- modifying an object classification,
- modifying an object track,
- a waypoint,
- modifying an event and/or other classification data (e.g., changing and/or adding an object label or event label),
- providing an additional classification and/or contextual information (e.g., creating a new label, temporarily relaxing an associated indication of unpredictability, for example, where a "dog in road" event might be associated with an unpredictable label the teleoperator may see that the dog is merely sitting off to the side of the roadway and may provide an indication of increased predictability to the vehicle 102),
- modifying a prediction generated by the vehicle 102 (e.g., the vehicle 102 might predict that a soccer player is likely to run into the street because of their current trajectory, but a modification of the prediction could reduce that likelihood because of the teleoperator's perception of the boundaries of the soccer field and its proximity to the road),
- creating a new rule associated with data identified by the vehicle 102 (e.g., storing a new state in a finite state machine of the vehicle 102 that configures the vehicle 102 to classify a combination of inputs with a newly associated classification and/or to perform an operation),
- classifying an area (e.g., identifying an area as being an accident scene for 30 minutes, which may cause other vehicles of the fleet to re-route), or
- expanding a driving corridor of the vehicle 102, so that the vehicle 102 can plan a collision-free trajectory;

a confirmation of a determination of the vehicle 102 of a trajectory, classification, prediction, use of horn and/or lights, rule to relax (e.g., driving corridor expansion), parameter alteration (e.g., speed limit decrease due to school zone, speed limit increase due to poor health of passenger), and/or an area classification; and/or ride control instructions that modify conditions affecting a passenger including one or more of:
- adjusting a temperature of an interior of the vehicle,
- adjusting a damping of a suspension system of the vehicle,
- presenting image, audio, and/or video via I/O device(s) of the interiors of the vehicle, and/or
- toggling interior-interior and/or exterior-interior noise-cancelling.

For example, if the SAE 308 were to receive operation state data from a vehicle 102 that detected 30 objects labeled "person," a null value for region activities retrieved from a regional map (this could be received from the vehicle 102 or retrieved via the teleoperations network 210), and an event of "crowd in roadway," the SAE 308 could obtain a video stream from a camera of the vehicle 102 and determine a presentation configuration 504 that includes the video stream at a primary display and a social media stream at a secondary display and/or an option to add a classification to the geographical area (e.g., an option to select a label corresponding to keywords from the social media stream that corresponds to the location of the vehicle 102).

In some examples, the SAE 308 may identify that at least a portion of the sensor and/or operation state data is similar to or matches sensor and/or operation state data associated with a prior request or event. In some examples, upon such an identification the SAE 308 may obtain data associated with the prior request or event such as prior sensor data, prior operation state data, prior teleoperator actions, and/or a presentation configuration and/or input option displayed during handling of the prior request or event at the teleoperations device. In some examples, the SAE 308 may determine to display at least a portion of the prior data associated with the prior request or event. For example, the SAE 308 could receive a request from a vehicle 102 at a construction site and determine that the request is related to a request that was previously received (e.g., geographic location matches, event label matches, and/or second request received within time limit). The SAE 308 may display data from the prior request and provide an input option corresponding to the guidance that was transmitted to the vehicle that sent the prior request.

Additionally, or alternatively, the SAE 308 may determine a number of teleoperations interface(s) 154 among a plurality of interfaces to which to relay the vehicle data subset 518 and interface instructions 520 and which particular teleoperations interface(s) 154 of the plurality to which to relay the request for assistance and/or a subset of data received from one or more vehicles 102, as described in detail herein.

In some examples, the interface instructions 520 can include instructions to create a communication channel session between the vehicle(s) 102 and teleoperations interface(s) 154, depending on configuration chosen, as discussed above. For example, the SAE 308 may transmit instructions to create a virtual server at the teleoperations system(s) 504 for handling data dissemination among teleoperations interface(s) 154 and the vehicle(s) 102 that facilitates teleoperator coordination of guidance to the vehicle(s).

Moreover, the SAE 308 may obtain teleoperations data 514 such as, for example, a teleoperator bandwidth associated with one or more teleoperations devices (i.e., an indication of available teleoperator capacity to monitor a subset of vehicles and/or to handle a request for assistance). In some examples, the teleoperator bandwidth may include device usage and/or limitations (e.g., hardware, network, or software limitations), a defined capacity of a teleoperator (e.g., m-th teleoperator may monitor up to 10 vehicles and handle up to one request at a time, n-th teleoperator may monitor up to 5 vehicles and handle up to two requests at a time), and/or current occupation of a teleoperator (e.g., identification of a type or number of tasks).

For example, the teleoperator bandwidth may be an indication based at least in part on a number of driverless vehicles assigned to a teleoperations device; an indication of a number of driverless vehicles that have an open communication session with a teleoperations device (e.g., vehicles sending minimal data to the teleoperations device to apprise the teleoperations device of general vehicles state and/or an active communication session opened by a request for teleoperator assistance that may include additional or alternative sensor and/or operation state data); an indication of progress of task completion at a teleoperations device; a number of requests in progress and/or a completion indication of one or more of the requests in progress; an indication of an engagement between a vehicle and another device, such as a teleoperations device and/or another vehicle 102; an indication of a level of escalation associated with a teleoperations device or the operation state data; an indication of teleoperator activity at a teleoperator device (e.g., I/O device operations such as mouse-clicks, a number of windows open and viewable) and/or teleoperations system health.

In some examples, the SAE 308 may use the teleoperations data 514 to determine an indication of teleoperator bandwidth, such as a percentage, to associate with one or more teleoperations devices (e.g., the indication of teleoperator bandwidth may be determined using a weighted sum). In some examples, this indication may be associated with an individual teleoperations device and/or teleoperator (e.g., n-th teleoperations device/teleoperator has 20% remaining teleoperator bandwidth) and/or a cluster of teleoperations devices. In some examples, the SAE 308 may use the indication of teleoperator bandwidth, the operation state data, and/or teleoperations data 514 to determine which teleoperations interface 154 to which to transmit a request for assistance, the vehicle data subset 518, and/or interface instructions 520. In some examples, the determination of the teleoperations interface 154 to which to transmit the request and/or the determination of the indication of teleoperator bandwidth may include a weighted sum, load balancing, and/or a weighted decision based on the indication of teleoperator bandwidth, the operation state data, and/or teleoperations data 514.

In some examples, the SAE 308 may include a model 508 that performs the determining discussed herein, such as determination of the presentation configuration 510, input option(s) 516, the vehicle data subset 518, interface instructions 520, and/or teleoperations interface(s) 154 to which to transmit data. In some examples, the model may include a FSM, DFA, ANN, DAG, and/or any other suitable technique for performing the determinations discussed herein.

In some examples, the model 508 may include multiple configurations depending on available input data and a desired output. For example, the vehicle data 512 can be used as an input to the model to output the vehicle data subset 518 and/or interface instructions 520 to drive the presentation configuration 510 and input option(s) 516 of a teleoperations interface 154; teleoperations data 514 and/or the vehicle data 512 can be used as input to the model 508 to determine which teleoperations interface(s) 154 to transmit data to; vehicle data 512 and/or teleoperations data 514 may be used as input to the model 508 to determine whether an action selected by a teleoperator via an input option 516 will be transmitted to a second teleoperations interface 154 before transmission to vehicle system(s), etc.

For example, FIGS. 5B and 5C illustrate an example table representing the structure and/or logic of a model 508 (e.g., where each row of the figures corresponds to one or more states in a DFA). In some examples, a model 508 may include a lookup table; a state machine (e.g., an FSM such as a DFA), and/or a machine-learned network (e.g., an ANN, CNN, DAG). Since a literal representation of the structure and values of a convolutional neural network, for example, configured to make the decisions discussed herein cannot so easily be represented with a figure, FIGS. 5B and 5C illustrate an table. This disclosure relies on knowledge of those skilled in the art to know that an FSM, ANN, and/or DAG may be trained using machine learning techniques and/or constructed by identifying certain teleoperator actions as labels and/or inputs to construct the model 508.

FIGS. 5B and 5C illustrate an action 524 (e.g., instructions and/or data provided as teleoperator guidance 522), an event associated with one or more of the action 524 or the example sensor and/or operation state data 530, an output bandwidth 528 (e.g., identifying a high bandwidth or a low bandwidth communication connection for a session between a vehicle and a teleoperation interface), and a variety of example sensor and/or operation state data 530(1)-530(11). Depending on how the model 508 is structured, in some examples, "stream" indicates that a stream of data is, or may be, made available and/or that it is required for an action 524; "bandwidth" indicates that a stream of data is, or may be, made available, depending on communication bandwidth constraints; "alternate" indicates that at least a portion of sensor and/or operation state data 530 can be used as an alternate for another portion of sensor and/or operation state data 530, "x" indicates that the indicated data is not available and/or is not required for an action 524, "all" in the event association 526 column indicates any event label, and "high" or "low" in the output bandwidth 528 column indicates a type of communication channel and/or a bandwidth requirement.

The example table illustrates any of a number relationships and logic of a model 508 to make decisions based on input data. For example, if the model 508 is a DFA configured to determine when to present an input option 516 at a teleoperations interface 514 corresponding to a particular action 524 of the action column 524, a corresponding columns of the row in which the action exists may represent a state in the DFA. In such an example, the model 508 may output the particular action 524 of a row (e.g., instructions are sent to a teleoperations interface 514 to present an option to activate the action 524) if a match is detected by the DFA for the permutation of the event association 526, output bandwidth 528, and operation state data 530(1)-530(11) specified in the same row as the action 524.

For example, referencing the top-most row of the example table, the model 508 may be configured to cause display of an input option 516 at a teleoperations interface 514 that allows the teleoperator to send instructions to turn on hazard lights of the vehicle 102 and/or flash lights of the vehicle 102 (i.e., an Action 534) if any event label is received (i.e., a state indicated in a first column of Event Association 536); if, at a minimum, a low output bandwidth is available (as shown in the second column of Output Bandwidth 538); and if basic pose updates 540(1), front camera data 540(2)), rear camera data 540(3)), LIDAR 3D data (540(6)), and replay data 540(7)) are available to be streamed to the teleoperations interface 514. In an example where the model 508 takes the form of a DFA, the model 508 may detect a match when such conditions exist and the model 508 may thereby output an indication to provide an input option 516 corresponding to "Turn on hazards; flash lights." One skilled in the art may appreciate that an ANN may be configured to make such a determination, additionally or alternatively.

In some examples, the model 508 may receive any portion of sensor data, operation state data, and/or teleoperator data (e.g., teleoperator bandwidth, indication of input made at a teleoperations interface) as input and may output instructions to obtain a type of data from the vehicle 102 (e.g., instructions to obtain one or more of 530(1)-530(11)), instructions to present a presentation configuration 510 at a teleoperations interface 514 (e.g., if front camera 530(1) is determined to be obtained, the configuration can include a large enough space on a display that details of the videos can be seen), an identification of a communication channel to use, and/or an availability of an action for selection as an input option 516 presented to a teleoperator 150. For example, the SAE 308 may be configured to transmit a vehicle data subset 518 and/or interface instructions 520 to a teleoperations interface 154 that makes available to a teleoperator 150 an option to activate a horn of the vehicle 102 if the operation state data of the vehicle 102 indicates "near occlusion" as an event at the vehicle 102, and the vehicle data subset 518 includes a stream of basic pose updates, front camera images and/or video (e.g., if bandwidth permits and/or as an alternate to LIDAR data), LIDAR data (e.g., if bandwidth permits and/or as an alternate to front camera images and/or video), and/or an indication that replay data is available (e.g., a window of historical sensor data captured and maintained by the vehicle and available for reproduction).

In additional or alternate examples, the example table represents other configurations of the model 508 to make other decisions such as, for example:

determining which operation state data 530 to present at a teleoperations interface based on a selection of an option corresponding to an action 524 (e.g., if a teleoperator activates an option to "reverse nudge" the vehicle, preemptively changing a presentation configuration of the user interface to present the operation state data 528 in the same row as the action 524, "reverse nudge");

determining a communication channel to use based on one or more of an action selected and/or operation state data 530 available or required; and/or determining a presentation configuration that includes operation state data 530 and/or an input option corresponding to an action 524 based on reception of an event label indicated in the event association 526 column (e.g., if the event label indicates "dynamic occlusion," the model 508 may determine to cause presentation of input options to "honk horn," "reverse nudge," "forward nudge," "add area classification," and/or "modify mission" at a teleoperator interface, and/or a presentation configuration that includes operation state data 530 associated with those actions).

In some examples, the API 506 may format the input data for use by the model 508 in a manner that is not literally depicted. For example, the API 506 may abstract received vehicle data 512 and/or teleoperations data 514 in a format that comports with a configuration of the model 508 such as a string that conforms to a schema for matching states of a DFA that are indicated according to the schema, a feature tensor for input to an ANN, etc. In some examples, the SAE 308 may learn the model 508 by training the outputs of the model to minimize teleoperator response time. For example, the model 508 may be trained using sensor data, operation state data, and/or teleoperator data (e.g., identification of the presentation configuration and/or input options displayed and/or activated, time from reception of request to transmission of teleoperator guidance 522) as training data.

Figure 6A:
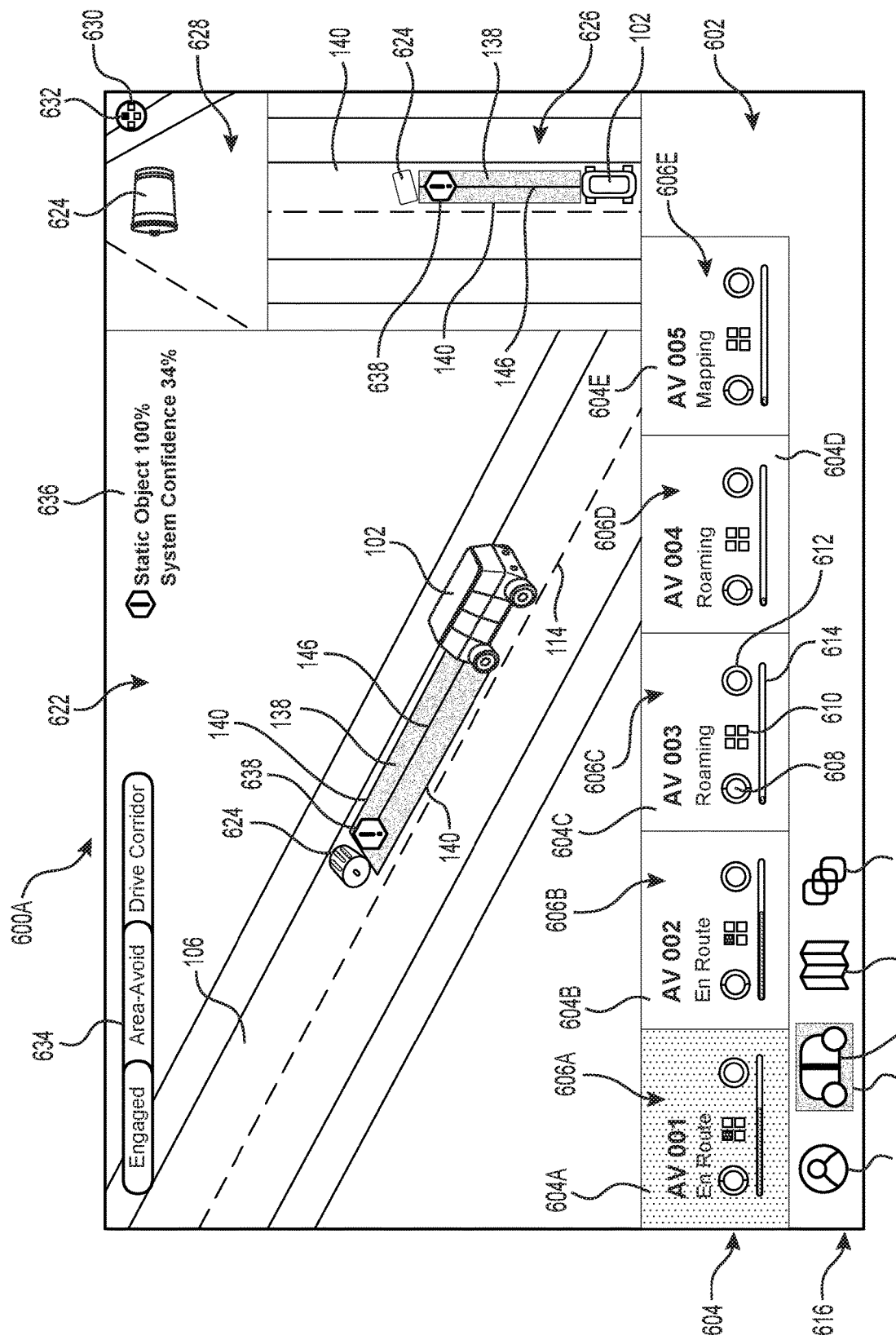
FIG. 6A is an example graphical user interface (GUI) to facilitate interaction between a teleoperator and an example vehicle in a first example event scenario in which an example static object is in the road.

FIG. 6A is an illustrative user interface (UI) 600A to facilitate interaction between a teleoperator 150 and an example vehicle 102 in a first example event scenario in which an example static object is in the road. The example GUI 600A may be displayed via one or more of the displays 156A, 156B, and 156C. The example GUI 600A shown in FIG. 6A includes a vehicle selection zone 602 providing multiple selectors 604 for selecting one of a number of vehicles 102 of the vehicle fleet 302 about which to display information related to its operation. In the example shown, the vehicle selection zone 602 includes selectors 604A, 604B, 604C, 604D, and 604E for selecting one of the vehicles designated, respectively, AV 001, AV 002, AV 003, AV 004, or AV 005. As shown in FIG. 6A, the information displayed relates to AV 001 as indicated by the shading of selector 604A, which corresponds to AV 001.

In some examples, such as shown, the selectors 604 each include status snapshots 606A, 606B, 606C, 606D, and 606E providing information related to the status of the respective vehicles 102. For example, status snapshots 606A and 606B indicate that AV 001 and AV 002 are "En Route," indicating they are currently between a start point and destination of respective trips. The status snapshots 606C and 606D indicate that AV 003 and AV 004 are "Roaming," indicating they are traveling the road network 104 without a defined destination. The example status snapshot 606E indicates that AV 005 is currently "Mapping," indicating that AV 005 is currently collecting data related to local map data and/or global map data.

In some examples, the status snapshots 606 may also include a charge indicator 608, an occupancy indicator 610, and a vehicle speed indicator 612. The charge indicator 608 may show the level of charge remaining in one or more batteries of the vehicle 102. The example occupancy indicator 610 may show that the vehicle 102 has four seats, depicted as squares, with one seat occupied, as depicted by the shaded square. Some examples of the status snapshot 606 may also include a trip status bar 614 providing an indication of the amount of a planned trip of the vehicle 102 that has been completed. The form of the icons shown in FIG. 6A are exemplary, and icons having other forms are contemplated. The information shown in the status snapshots 606 is exemplary, and additional or other information may be shown.

The example GUI 600A shown in FIG. 6A also includes a viewer selector bar 616, which includes view selector icons 618A, 618B, 618C, and 618D permitting the teleoperator to select a type of view shown in the GUI 600A. In the example shown, the view selector icon 618A, if selected, may provide an interface for the teleoperator 150 to set preferences (e.g., default preferences) for the information shown by the GUI 600A. The view selector icon 618B, selected in FIG. 6A as indicated by the shaded box 620 surrounding the view selector icon 618B, provides the teleoperator 150 with a 3-dimensional representation of the selected vehicle 102 constructed from LIDAR data, for example, as shown in FIG. 6A. Note that, in some examples activating this feature can cause a request to be transmitted form the teleoperations system to the vehicle for LIDAR or other data sufficient to render a three-dimensional model. Although a 3-dimensional representation of the selected vehicle 102 is illustrated in FIGS. 6A-7C, in some examples any permutation of sensor data, operation state data, and/or teleoperations data may be presented in the GUI, whether by a default, a setting, a decision of the SAE 308, and/or a teleoperator input (e.g., selection of a view selector icon). The view selector icon 618C, if selected, may provide the teleoperator 150 with a view of a map showing the road network 104 in an area relevant to operation of one or more of the vehicles 102 of the vehicle fleet 302. The view selector icon 618D, if selected, may facilitate configuring the information and/or the arrangement of information shown by the GUI 600A.

For example, as shown in FIG. 6A, the view selector icon 618B has been selected, and the GUI 600A includes an active view zone 622 providing a real-time simulated (or animated) perspective view of the vehicle 102 selected via the selector 604A. In the example shown, the active view zone 622 shows a representation (e.g., an animation, video) depicting the vehicle 102 encountering an object 624 in the road 106. The teleoperator 150 may use the active view zone 622 to monitor the operation of, and the teleoperator's interaction with, the selected vehicle 102 (i.e., AV 001 in this example) before, during, and/or after the teleoperator 150 interacts with the vehicle 102 via the teleoperator interface 154. For example, the vehicle 102 may send communications signals to the teleoperator system 148 including sensor signals from one or more sensors associated with the vehicle 102 and/or a request for guidance and/or information from the teleoperations system 148. Based at least in part on the communications signals, the active view zone 622 provides a real-time perspective view of the vehicle 102 and the relevant environment. In some examples, the active view zone 622 may display any permutation of sensor data, operation state data, and/or teleoperations data. In some examples, as discussed herein, the permutation displayed may be determined a default, a setting, a decision of the SAE 308, and/or a teleoperator input.

The example GUI 600A shown in FIG. 6A also includes an overhead view zone 626, which provides an representation of an overhead view corresponding to the view shown in the active view zone 622. This provides the teleoperator 150 with an alternative view, which may assist the teleoperator 150 in situations for which an overhead view may facilitate the teleoperator's interaction with the vehicle 102.

The example GUI 600A shown in FIG. 6A also includes a video view zone 628. In some examples, the video view zone 628 may provide a real-time video view from a video camera associated with the vehicle 102. In some examples, the video view zone 628 may additionally or alternatively display any sensor data, operation state data, and/or teleoperations data. In some examples, such data may include real-time data and/or historical data. This may assist the teleoperator 150 with quickly understanding the situation encountered by the vehicle 102. The example video view zone 628 also includes a view selector 630 which facilitates the teleoperator's selection of one of the video cameras associated with the vehicle 102. For example, the vehicle 102 may include cameras providing views from the perspective of one or more of the front, the sides, and the rear of the vehicle 102, and the view selector 630 may permit selection of one of the cameras from which to provide real-time video. In the example shown, a selector control 632 corresponding to the front camera has been selected, and the video view zone 628 shows the view from the front video camera of the vehicle 102.

The example GUI 600A shown in FIG. 6A also includes an interaction bar 634, which may provide an indication of how the teleoperator 150 is interacting with a vehicle 102 and/or selectable options association with guidance that may be provided to the vehicle. For example, the interaction bar 634 may include icons for indicating whether the teleoperator 150 is interacting with the vehicle 102, which may be depicted by highlighting of the "Engaged" icon. If the teleoperator 150 is communicating with the vehicle 102 by identifying an area the vehicle 102 should avoid, the "Area-Avoid" icon may be highlighted. If the teleoperator 150 is communicating with the vehicle 102 by changing the vehicle corridor 138, the "Drive Corridor" icon may be highlighted. In some examples, the options displayed (e.g., area-avoid, drive corridor) can be determined by the interface instructions 520. For example, since the vehicle has identified the object in this scenario as being static, the SAE 308 may use that identification to determine that "area avoid and/or driver corridor options be presented to the teleoperator for selection. Other additional or alternate icons and related information are contemplated.

The example GUI 600A shown in FIG. 6A also includes an alert bar 636 configured to provide an indication of an event being encountered by the vehicle 102. For example, as shown in FIG. 6A, the alert bar 636 indicates that the vehicle has encountered a static object 624, and that the vehicle 102 has a confidence level of 100% that the object 624 is in the vehicle corridor 138, that it is a static object, and/or that it is confident that the classification is correct. Other forms and types of alerts are contemplated. For example, the alert bar 636 may display an overall system confidence of the vehicle and/or confidences of subsystems of the vehicle 102 such as, for example, the planner 214, the collision predictor system 220, kinematics calculator 222, etc. In some examples, one or more of the active view zone 622, the overhead view zone 626, or the video view zone 628 may include an alert icon 638, which may include an exclamation point, for example, as shown.

In some examples, the GUI 600A may include colorcoded information. For example, alerts may be depicted in red, the vehicle corridor 138 may be depicted in green, and objects may be depicted in pink or red. Other color-coded combinations are contemplated.

In some examples, the status snapshots 606, media occupying the active view zone 622, media occupying the overview zone 626, media occupying the video view zone 628, information and/or options displayed in the interaction bar 634, and/or the alert bar 636 are displayed based at least in part on a vehicle data subset 518 and/or interface instructions 520 provided to a teleoperations interface 154 which is displaying the example GUI 600A. For example, the vehicle data subset 518 may include a video stream corresponding to AV 001, battery charge data for AVs 001-005, occupancy data for AVs 001-005, LIDAR and object classification data from AV 001, etc., and the interface instructions may indicate that a three-dimensional representation of AV 001 be rendered in a primary portion of the display and that any existing preferences of the teleoperator 150 regarding the status snapshots 606 may be exercised.

As discussed above, the SAE 308 may determine a different presentation configuration for a particular permutation of sensor data and/or operation state data (vehicle data 512) obtained from a vehicle 102. For example, if the operation state data includes an event that indicates a "flagger" or a "heard of erratic animals," then one or more video streams may occupy the active view zone 622 or an entirety of the display. For example, if a large group of erratically moving objects surrounds the vehicle the SAE 308 may determine that the vehicle data subset 308 should include video streams from all cameras of the vehicle and the interface instructions 520 should override some teleoperator preferences and/or direct the teleoperations interface 154 to display four to six video streams over three displays with only a corner of each display devoted to other representations (e.g., options for the teleoperator 150, status snapshots 606, and/or selectors 618)

FIG. 6A shows an example vehicle 102 in a first example event scenario in which the example static object 624 is in the road 106. In some examples, as the vehicle 102 approaches the object 624, the sensors 204 (FIG. 2) associated with the vehicle 102 may detect the object 624. Once detected, one or more of the planner 214, the object data calculator 216, the object classifier 218, the collision predictor system 220, and the kinematics calculator 222 (FIG. 2) may be used to determine the location of the object 624, classify the object 624, determine whether the object 624 is static or dynamic, and if the object is dynamic, predict a possible track (e.g., velocity, acceleration, and/or heading) of the object 624. As the vehicle 102 approaches the object 624, one or more of these systems may be used to calculate a confidence level associated with a probability that the vehicle 102 will be able to successfully maneuver past the object 624, for example, without assistance from the teleoperations system 148. In some examples, the vehicle 102 can record confidence levels over time and determine a rate of change of the confidence levels. In some examples, any portion of these determinations or representations thereof may be amalgamated into operation state data.

As the confidence level drops below a threshold minimum confidence level (e.g., confidence level is less than or equal to 79%) and/or if the vehicle detects that a rate of change of the confidence levels over time indicates a negative rate of change for a threshold duration of time (e.g., −2% per second for at least 5 seconds) and/or a rate of change having a threshold magnitude (e.g., −9% per second) (and/or any other qualities of various forms of rates of change such as average rate of change over a moving window), the vehicle 102 may slow its speed or stop, and use its network interface 234 (FIG. 2) to send communication signals to the teleoperations system 148 providing sensor data and/or operation state data with a request for guidance from the teleoperations system 148.

In some examples, the vehicle 102 may use any additional or alternate portion of the sensor and/or operation state data to determine whether to transmit a request for assistance. For example, the vehicle 102 may determine that it is approaching a region where one or more other requests have been sent within a time period (e.g., last day, last half hour) (e.g., from the vehicle 102 and/or from other vehicle(s) of a fleet), that it is approaching a high-risk area (e.g., train crossing, school zone), that it is moving at a speed that is below a speed limit or a speed of traffic surrounding the vehicle 12, that it is stopped at a position that is not identified as a stop location in a map stored in memory accessible to the processor, that a classification of an object or event detected from the sensor data is associated with an indicator of high unpredictability (e.g. "dog in road," "construction zone: flagger"), and/or that maneuvers determined by the vehicle 102 as being ones that avoid a collision are of a type that is high-risk and is therefore associated with a low confidence (e.g., crossing double yellow line).

In some examples, the request may be inferred and/or determined by the teleoperations system 148 based at least in part on, for example, the sensor data and or other information associated with the vehicle 102, such as its change in speed, confidence level, rate of change of confidence levels over time, and/or other maneuvering that might be indicative of a need for guidance from the teleoperations systems 148. In some examples, the request may be inferred and/or determined based at least in part on the location of the vehicle 102 and/or knowledge of an event occurring at the location. The teleoperations receiver 304 (FIG. 3) of the teleoperations system 148 may receive the communication signals, the situation may be evaluated by a teleoperator 150 via the teleoperations interface 154 (with or without accessing the teleoperations data 310 via the teleoperations network 308), and the teleoperator 150 may send teleoperations signals to the vehicle 102 via the teleoperations transmitter 306 providing guidance, for example, as described herein.

In the example shown in FIG. 6A, the vehicle 102 approaches the object 624, for example, a garbage can on its side, until the vehicle corridor 138 overlaps with the object 624, at which point the confidence level drops below the threshold confidence level. The vehicle 102 sends communication signals to the teleoperations system 148 including a request for guidance, for example, as described herein and sensor data and/or operation data. In some examples, the SAE 308 determines a presentation configuration and an input option to be displayed at the teleoperations interface and generated a vehicle data subset and interface instructions to cause such representations at the teleoperations interface. In the example shown, this may result in the alert icons 638 displayed in the active view zone 622 and the overhead view zone of the GUI 600A to draw the teleoperator's attention to the object 624 and/or the general configuration of the various zones and options shown, as discussed above. The teleoperator 150 may use the teleoperator interface 154 to provide the requested guidance.

Figure 6B:
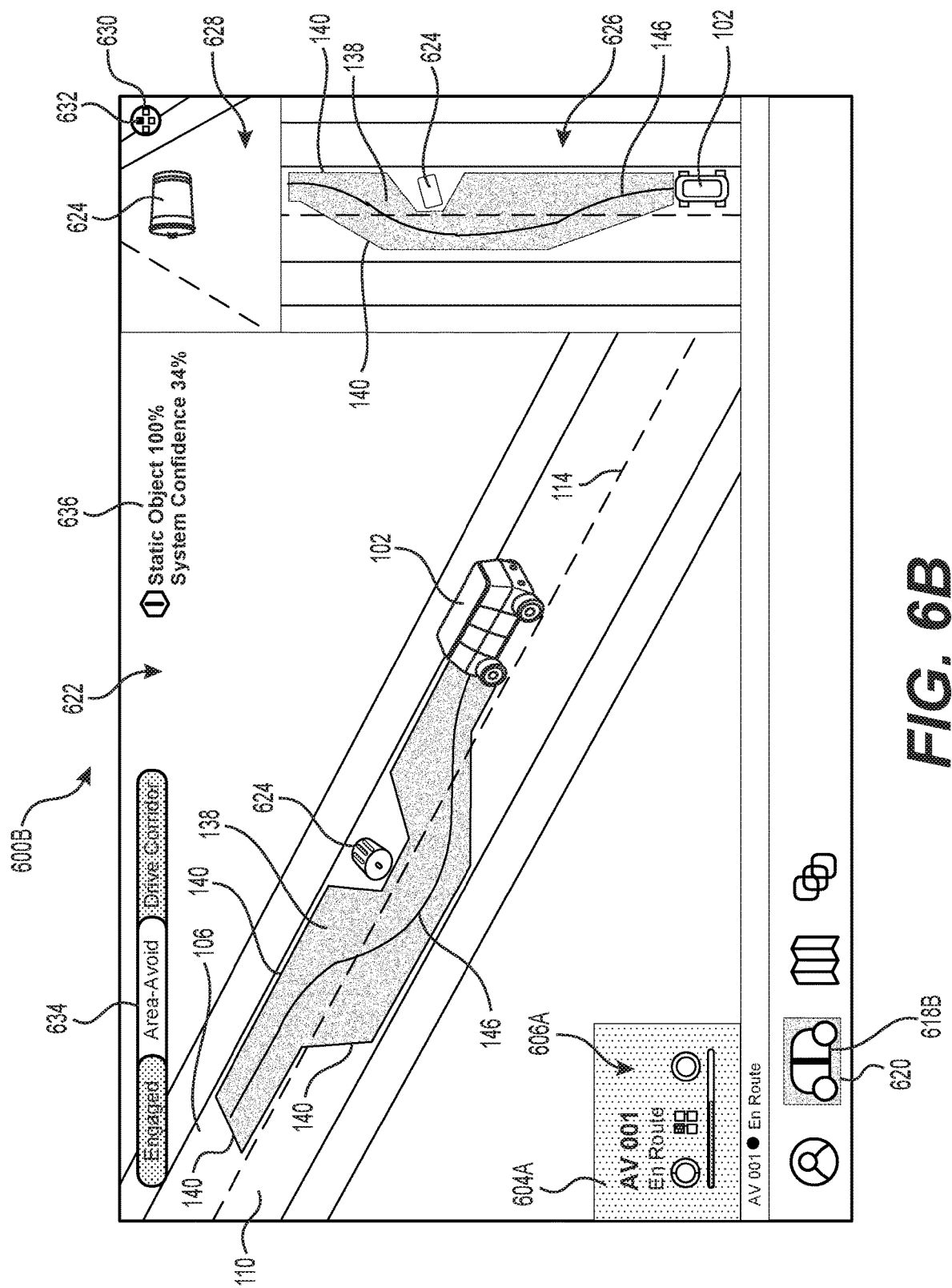
FIG. 6B is an example GUI to facilitate interaction between a teleoperator and the example vehicle in the event scenario shown in FIG. 6A during example interaction between the teleoperator and the vehicle.

FIG. 6B is an example GUI 600B configured to facilitate interaction between the teleoperator 150 and the example vehicle 102 in the example event scenario shown in FIG. 6A. In the example shown, the teleoperator 150 has selected the view selector icon 618B, so the GUI 600B displays information related to the vehicle 102. For example, the active view zone 622 shows an animated perspective depiction of the vehicle 102 as it approaches the object 624. The overhead view zone 626 shows an animated overhead view of the vehicle 102 as it approaches the object 624, and the video view zone 628 shows a live video camera view of the object 624 in front of the vehicle 102. In some examples, the teleoperator 150 may select live video feed from a different camera by selecting a different one of the buttons 632 of the view selector 630 and/or the SAE 308 may alternate the view.

The GUI 600B shown in FIG. 6B shows example teleoperator 150 interaction with the vehicle 102. The example interaction bar 634 indicates that the teleoperator 150 is engaged with the vehicle 102, depicted by the shaded "Engaged" icon, and that the teleoperator 150 activated an option to alter the boundaries 140 of the vehicle corridor 138, depicted by the "Drive Corridor" icon being shaded. For example, the teleoperator 150 has expanded the boundaries 140 of the vehicle corridor 138 to the second lane 110, across the lane dividing line 114. In some examples, the teleoperator 150 may accomplish this using the teleoperations input device 158 (FIG. 4), which may involve the use of one or more of a touch-sensitive screen, a stylus, a mouse, a dial, a keypad, a microphone, and/or a gesture-input system. Based on the teleoperator's 150 inputs, the teleoperations system 148 may transmit teleoperations signals to the vehicle 102 via the teleoperations transmitter 306 (FIG. 3).

In the example shown, the vehicle 102 may expand the boundaries 140 of its vehicle corridor 138 in a manner consistent with the teleoperations signals, for example, as shown in FIG. 6B. Upon expansion of the vehicle corridor 138, the vehicle 102 may generate, for example, via the vehicle systems 202 (FIG. 2), a plurality of revised trajectories (e.g., concurrently or substantially simultaneously within technical capabilities) based at least in part on the altered boundaries 140 of the vehicle corridor 138. In some examples, the vehicle 102 may calculate a confidence level for each of the revised trajectories, and the vehicle 102 may select a revised trajectory having the highest confidence level from among the plurality of revised trajectories. Based at least in part on the selected revised trajectory, the vehicle 102 may determine a revised drive line 146 for use in maneuvering around the object 624. Thereafter, the vehicle controller 228 (FIG. 2) may be configured to operate the vehicle 102 according to the revised drive line 146, for example, as shown in FIG. 6B, and maneuver around the object 624.

In some examples, the session between the teleoperations interface 154 and the vehicle 102 may terminate upon the transmission of the driving corridor modification and/or the session can continue (e.g., the vehicle 102 can provide a trajectory and/or revised driveline 416). In some examples, the communication signals included in the vehicle data subset 518 forwarded by the SAE 308 from the vehicle 102 may include a proposed drive line 146 to maneuver around the object 624, and the interface instructions 520 may instruct the teleoperations interface 154 to display an option to confirm, modify, and/or reject the proposed drive line 164. Upon confirmation by the teleoperator 105, the teleoperations system 148 may send teleoperations signals including an indication of approval of the revised drive line 146 proposed by the vehicle 102. If rejected/modified, the teleoperator 150 may indicate an alternative proposed drive line, and send teleoperations signals to the vehicle 102, including a denial of the revised drive line 146 proposed by the vehicle 102 and the alternative proposed drive line for evaluation and possible execution by the vehicle 102.

The driving corridor adjustment and subsequent generation of trajectories by the vehicle 102 and the transmission of an alternative proposed drive line and the vehicle's 102 ability to accept or reject such alternative proposed drive line are both examples of corroborative guidance, whereas a direct instruction or command, as termed herein, configure the vehicle to perform an operation specified by the command.

Figure 7A:
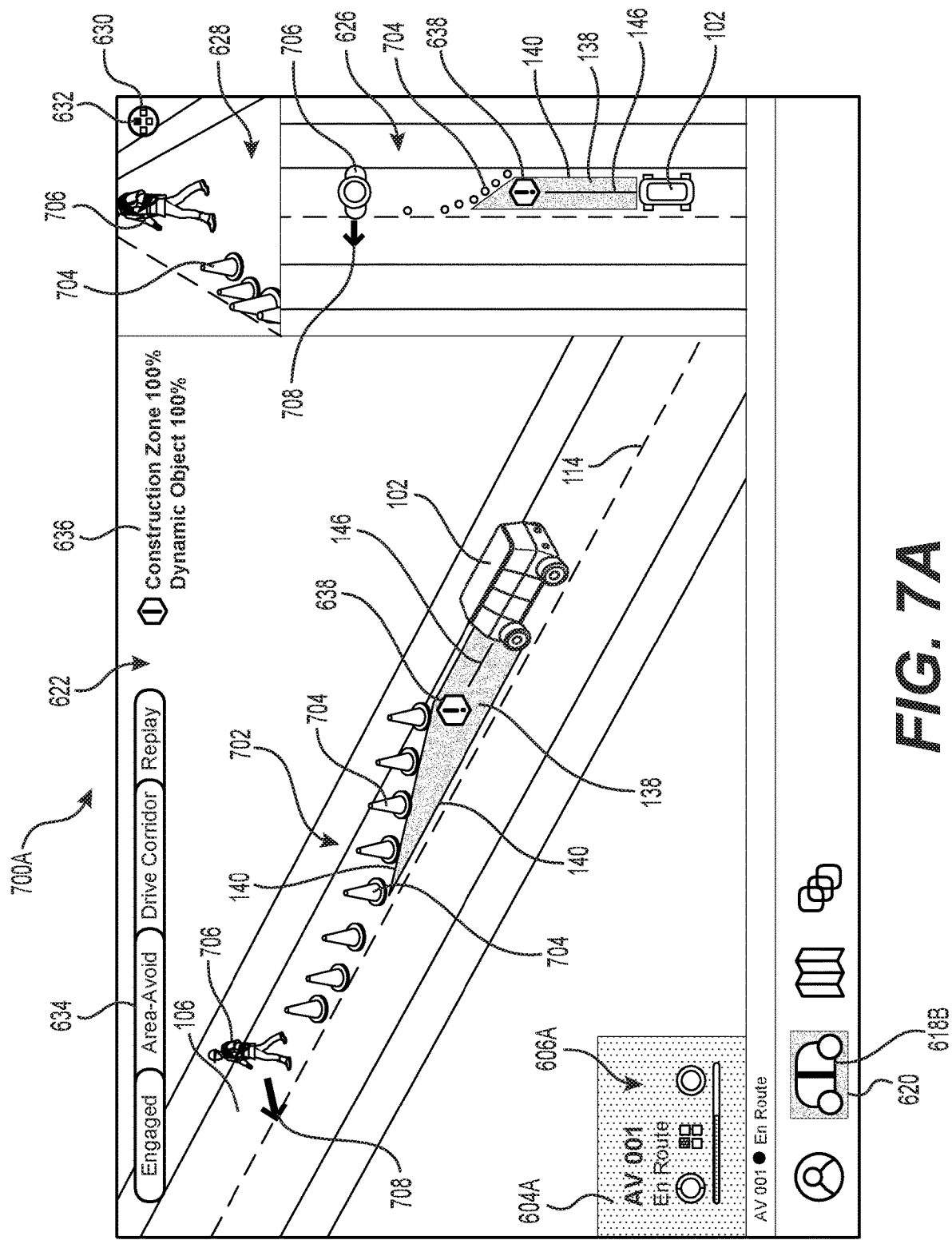
FIG. 7A is an example GUI to facilitate interaction between a teleoperator and an example vehicle in a second example event scenario in which the vehicle has encountered an example construction zone that includes both example static and dynamic objects in the road.

FIG. 7A is an example GUI 700A showing a second event scenario in which the vehicle 102 has encountered an example construction zone 702 that includes both example static objects 704 and an example dynamic object 706 in the road 106. In the example shown, the static objects 704 are traffic cones, and the dynamic object 706 is a person. As the vehicle 102 approaches the construction zone 702, the sensors 204 associated with the vehicle 102 may detect the static objects 704 and/or the dynamic object 706, and once detected, the vehicle 102 may determine the location of the static objects 704 and the dynamic object 706, classify them, and/or predict a possible trajectory of the dynamic object 706.

As the vehicle 102 approaches the construction zone 702, the vehicle 102 may calculate a confidence level associated with a probability that the vehicle 102 will be able to successfully maneuver past the constructions zone, for example, without assistance from the teleoperations system 148. As the confidence level drops below a threshold minimum confidence level and/or if the vehicle detects that a rate of change of the confidence levels over time indicates a negative rate of change for a threshold duration of time (e.g., −2% per second for at least 5 seconds) and/or a rate of change having a threshold magnitude (e.g., −9% per second), the vehicle 102 may slow its speed or stop, and use its network interface 234 (FIG. 2) to send communication signals to the teleoperations system 148 providing sensor data and/or operation state data with a request for guidance from the teleoperations system 148. Alternately, or additionally, the vehicle 102 may identify that it is approaching a region where one or more other requests have been sent within a time period (e.g., last day, last half hour), a high-risk area (e.g., train crossing, school zone), and/or that maneuvers determined by the vehicle 102 as being ones that avoid a collision are of a type that is high-risk and is therefore associated with a low confidence (e.g., crossing double yellow line).

The teleoperations system 148 may receive the communication signals, the situation may be evaluated by a teleoperator 150 via the teleoperations interface 154, and the teleoperator 150 may send teleoperations signals to the vehicle 102 via the teleoperations transmitter 306 providing guidance.

In the example shown in FIG. 7A, the vehicle data subset 518 and interface instructions 520 may configure the teleoperations interface 154 displaying the GUI 700A to display the alert bar 636 of the GUI 700A to indicate that the vehicle 102 has arrived at a construction zone, that there is at least one static object and at least one dynamic object associated with the construction zone, and further, that the confidence level associated with each of those identifications is 100%. In some examples, additional or alternative notifications, such as a confidence of the overall system and/or subsystems of the vehicle 102 may be displayed (e.g., in the alert bar 636 or elsewhere) based on a menu activation, an input option selection, a current view, etc. In some examples, additional information may be displayed, as it is available (e.g., further classifications such as, "dynamic object: person 98%"). In the example shown, one or more arrows 708 may provide an indication of a predicted track of the dynamic object 706 based on, for example, its type and/or classification, and/or its prior and/or current trajectory, which may be included in the vehicle data subset 518.

Figure 7B:
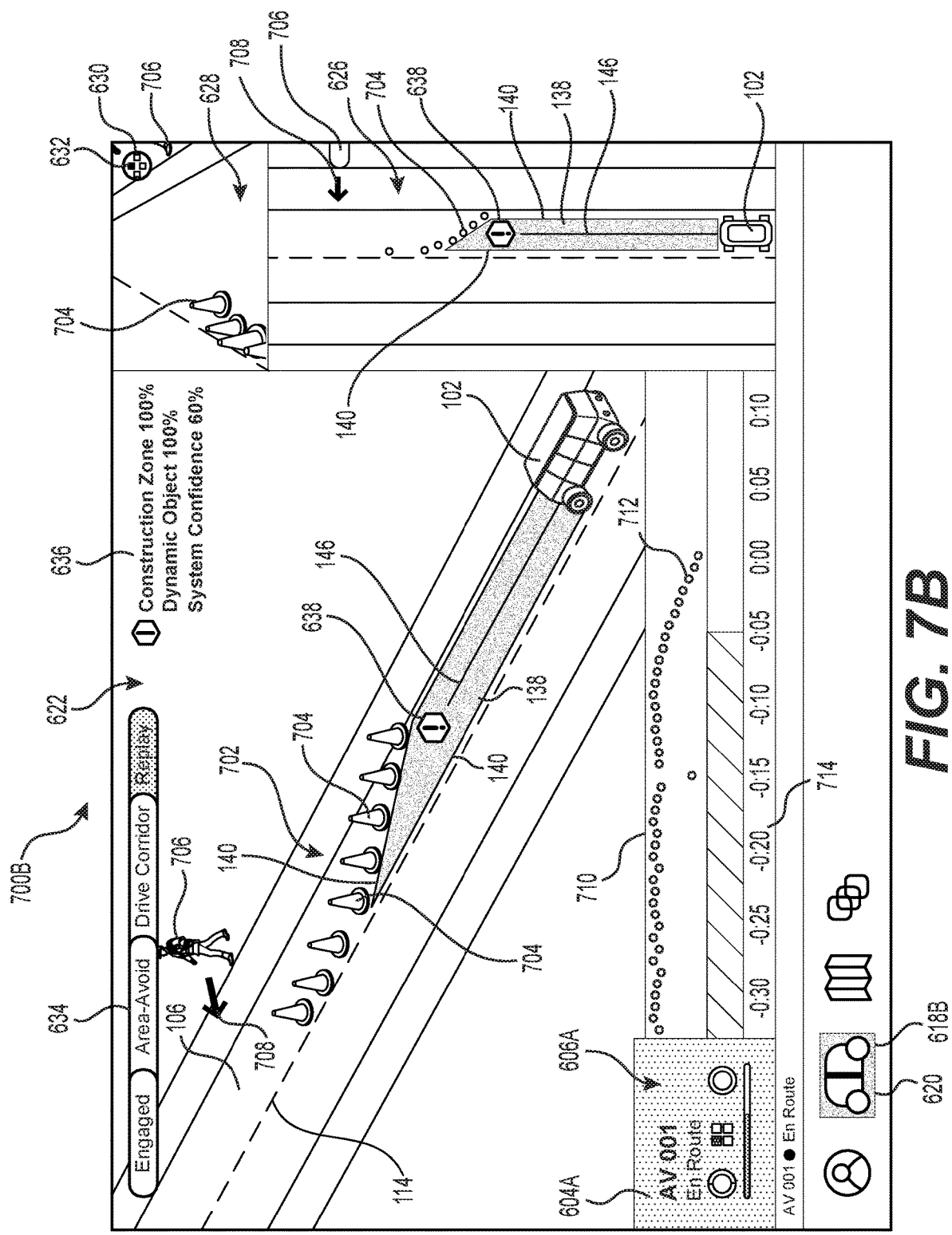
FIG. 7B is an example GUI to facilitate interaction between a teleoperator and the example vehicle in the event scenario shown in FIG. 7A during example interaction between the teleoperator and the vehicle.

FIG. 7B is an example GUI 700B configured to facilitate interaction between the teleoperator 150 and the example vehicle 102 to overcome the example construction zone 702 shown in FIG. 7A. The example interaction bar 634 indicates that the teleoperator 150 has activated a replay option depicted by the shaded "Replay" icon. In some examples, the vehicle 102 can maintain a record of sensor and/or operation state data sensor and/or operation state data for retrieval by the teleoperations system.

In some examples, the vehicle 102 can continually store such sensor and/or operation state data for a rolling window of time. For example, the vehicle 102 can maintain a record of at least some of the sensor and/or operation data captured and generated by the vehicle in the last 10 seconds, last 30 seconds, last 5 minutes, last hour, etc. In some examples, the vehicle 102 can capture this information at intervals (e.g., save data every 3 seconds for 30 seconds) and/or continuously. In some examples, the vehicle 102 can maintain data for as long as certain operation state data persists in a defined state. For example, the data can be retained for as long as the vehicle 102 continues to identify an event "construction zone" and/or may maintain data corresponding to a current and a most recent former event.

In some examples, a model of the vehicles may determine a subset of the sensor and/or operation data to save based on at least part of the sensor and/or operation data. For example, the operation state data may include a "dog in road" event and the model may determine that there is a high likelihood that a teleoperations interface 154 would utilize front camera video data if the vehicle 102 generates a request for assistance based on that event, whereas for an "interior emergency" event, the model may determine that there is a high likelihood that a teleoperations interface would utilize an interior video and an interior audio stream to provide guidance.

In some examples, the vehicle may initiate capture of the subset of the sensor and/or operation data based on a confidence level or a rate of change of the confidence level. For example, the vehicle may begin retaining a subset of sensor and/or operation data upon detecting that a confidence level is below a threshold and/or that a rate of change of confidence levels over time indicates a decrease.

In the example shown in FIG. 7B, the vehicle data subset 518 and interface instructions 520 may configure the teleoperations interface 154 displaying the GUI 700B to display a confidence levels replay 710 and/or other sensor and/or operation data associated therewith. In the example shown, the vehicle 102 has employed a 30 second "rolling window." In this example, the teleoperator was provided with an option to activate a replay by activating the "Replay" option in the interaction bar 634. In some examples, upon selecting this option, the GUI 700B can present confidence levels 712 and vehicle 102 sensor and/or operation data corresponding therewith. For example, the confidence levels 712 may be displayed with their corresponding historical time 714 (e.g., confidence level 30 seconds ago, i.e., "−0:30" and video frame(s), LIDAR data, and/or vehicle pose associated with that time). In some examples, the vehicle 102 may initiate capture and/or transmit data to be used for replay based at least in part on bandwidth of a communication channel. For example, the vehicle 102 may retain data for the duration of degradation of the communication channel and may transmit the data upon restoration of the communication channel.

In the example shown, the vehicle data subset 518 and interface instructions 520 may configure the teleoperations interface 154 displaying the GUI 700B to display sensor and/or operation data corresponding to historical time 714, including the historical confidence levels 712, a three-dimensional representation of the scene using historical LIDAR data at a time 5 seconds in the past ("−0:05.") in the active view zone 622, a video at "−0:05" in the video view zone 628, and an overhead representation of the scene based on vehicle location and/or pose data at "−0:05" in the overhead view zone 626, for example. In some examples, the request for assistance may have been generated at "−0:05" based on the rate of change in the confidence levels 710 that exhibited a decrease (note that in some cases the outlier confidence level 712 at "0:15" may have generated the request, although, in some examples, the vehicle can smooth the confidence level data and/or generate requests for average rate of change over time so that this outlier would not trigger a request for assistance).

In this example manner, a teleoperator 150 is enabled to identify what caused confidence levels to drop. For example, though the video view zone 628 displays a video at "−0:05" that does not include the dynamic object 706, the LIDAR data (e.g., from which the three-dimensional representation is rendered at the active view zone 622) indicates that the dynamic object 706 and the vehicle's confidence that the object in the LIDAR data is a "dynamic object" is 100%. In such an example, this discrepancy may be used to inform a teleoperator of the reason for the confidence drop. In some examples, the teleoperator 150 may be able to identify that a camera has been knocked out of position and/or that the confidence dropped because the field of view of the camera was insufficient to identify the dynamic object 706, either of which may be conditions that may cause a decrease in confidence levels because the sensor and/or operation data seems to conflict. In some examples, the overall system confidence and/or any of the displayed data may be replayed (e.g., the system confidence shown in the alert bar 636 may additionally or alternatively reflect the drop in confidence levels at 712).

In some examples, the teleoperator may be able to manipulate the time representation and/or select confidence levels to view sensor and/or operation data at a corresponding time. In some examples, upon receipt of a request for assistance, the teleoperations interface 154 may automatically present a replay to apprise the teleoperator 150 of the situation.

Figure 7C:
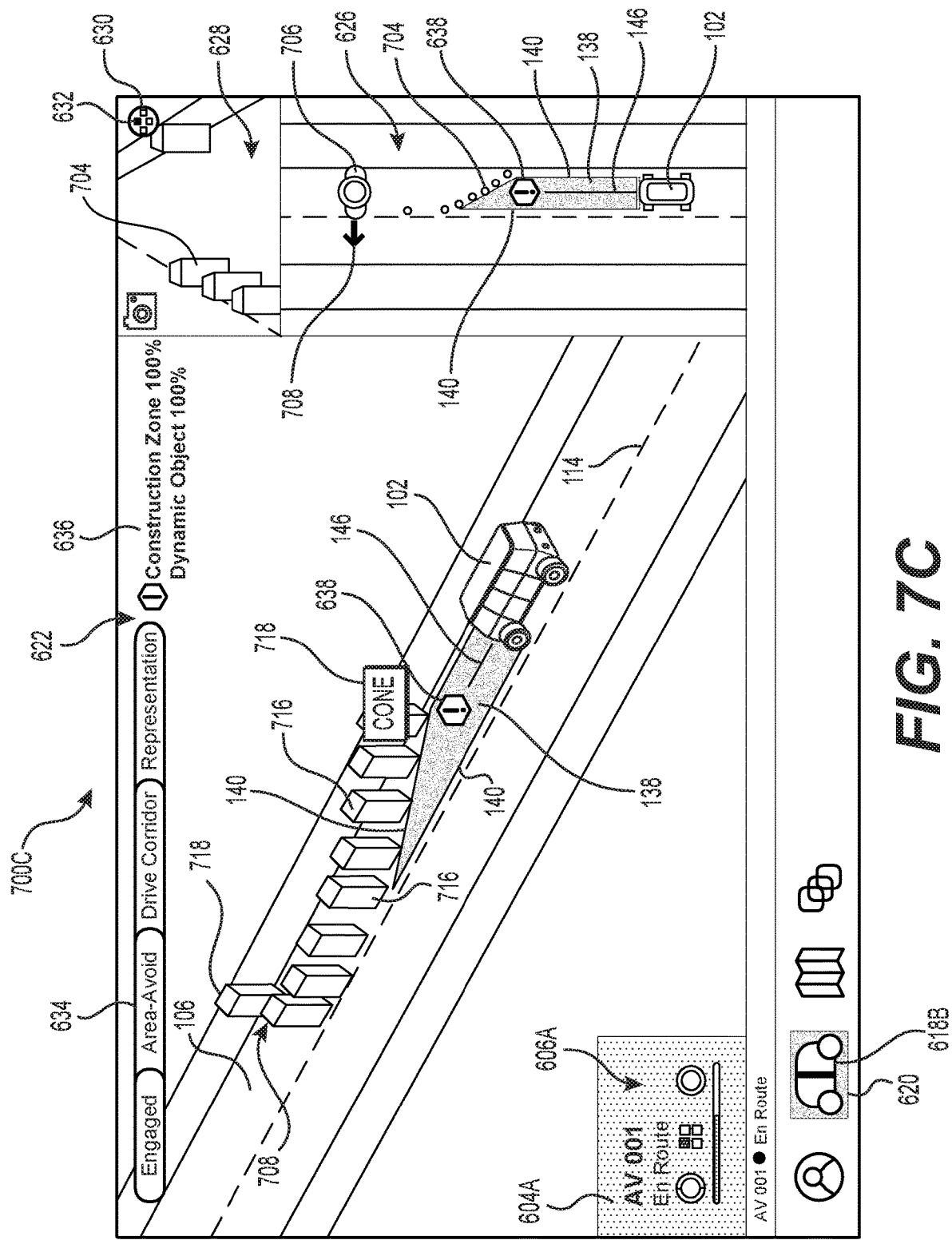
FIG. 7C is an example GUI to facilitate interaction between a teleoperator and the example vehicle in the event scenario shown in FIG. 7A during example interaction between the teleoperator and the vehicle when a "replay" option is activated.

FIG. 7C is an example GUI 700C configured to facilitate interaction between the teleoperator 150 and the example vehicle 102 to overcome the example construction zone 702 shown in FIG. 7A. The example interaction bar 634 indicates that a "Representation" view is activated. In some examples, the vehicle 102 may transmit data in a reduced format based at least in part on a bandwidth of a communication channel between the vehicle and the teleoperations system, a fleet-wide network bandwidth, and/or an indication by a model of the vehicle 102 and/or the SAE 308 that a reduced format is sufficient.

In some examples, the vehicle 102 may determine to send a request for assistance to the teleoperations system 148, and the vehicle 102 may determine a subset of the sensor and/or operation data to transmit. In some examples, the vehicle 102 may determine whether to stream a reduced format of the subset of the sensor and/or operation data based at least in part on a bandwidth of a communication channel between the vehicle 102 and the teleoperations system, and/or a fleet-wide network bandwidth. In some examples, the sensor and/or operation data may include a stream of data, and the vehicle 102 may determine to modify the stream dynamically as it determines a bandwidth of a communication channel. For example, the vehicle 102 may determine that qualities of a communicational channel have degraded and the vehicle 102 may accordingly adjust the subset of sensor and/or operation data transmitted (e.g., by relaying a representation of the subset instead, by reducing the types of data relayed, and/or by further compressing the data). In some examples, in addition or alternatively to the raw form of sensor data, the subset of sensor and/or operation data the vehicle may transmit the subset of sensor and/or operation data in an alternate form such as, for example, a compressed file, one or more bounding boxes, a location identifier, and/or a classification of an object or scene.

In some examples, the reduced format may include a textual representation (e.g., an object classification) a position of an object, qualitative features (e.g., estimated height, width), and/or a bounding box instead of, for example, a video stream of an object. For example, instead of transmitting an entire video stream, portions of the video could be replaced with a box and/or a classification label. In some examples, such a label may also comprise an icon representing the classification.

FIG. 7C illustrates example representations of static objects 716 and an example representation of a dynamic object 718. The depicted example representations 716 and 718 are examples of three-dimensional bounding boxes. In some examples, a bounding box delineates an estimated area and/or volume occupied by an object detected from sensor data captured by the vehicle 102. In some examples, for a three-dimensional bounding box, the vehicle 102 can transmit a location of the center of a base of the box and dimensions of the bounding box for one or more of the objects. In some examples, the vehicle 102 can include a label with a box such as an object classification. In some examples, such labels may include one or more of text, an icon, an animation, and/or an audio clip. In some examples, once this data is generated, the vehicle 102 may compress and transmit the bounding box data. In some examples, such as in the place of video or an image, the vehicle can generate bounding box information that includes a location of the center of an object in an image and a relative height and width of the box (e.g., the pixels of a square that bound the object in the image). In some examples, the bounding box may be two-dimensional and may include any shape(s) appropriate for representing an object.

In some examples, the example representations 716 and 718 may additionally or alternatively include a label such as, for example, an object label or a scene label that corresponds to a classification made by the vehicle 102. FIG. 7C depicts an example label 718 titled "Cone." In some examples, the label may be identified by the SAE 308 from the sensor and/or operation state data and determined to be displayed. In some examples, the teleoperations interface 154 may make the label available for editing by the teleoperator. Upon editing the label, the teleoperations interface 154 may transmit a signal to the vehicle 102 providing an updated classification for the object (for example) to which the label corresponds. Similarly, such display and/or editing of a label may be provided for object tracks, predicted object movements, and/or any of the sensor and/or operation state data discussed herein.

In some examples, the vehicle 102 may control whether or not data is transmitted in a reduced format or in its raw format. In some examples, the teleoperations system 148 may request that the vehicle 102 increase a quality of the data transmitted, or that the vehicle 102 add or change a communication channel used to transmit data so that additional and/or higher quality data may be transmitted. For example, a vehicle 102 may have chosen to use a low-bandwidth communication channel to transmit sensor and/or operation data that includes bounding boxes, and a teleoperator 150 may select an option to request that the vehicle 102 increase the amount and/or quality of the data transmitted (e.g., request to additionally transmit a video stream and/or transmit a video stream instead of still images). The vehicle 102 may determine whether or not to comply, in some examples. In some examples, the vehicle 102 may change a communication channel used to transmit data to a channel that provides more bandwidth to provide a video stream to the teleoperations system. In some examples, the teleoperations system 148 may generate representations based at least in part on sensor and/or operation data from the vehicle 102 to make it more apparent to a teleoperator 150 to discern the event or situation.

Figure 8:
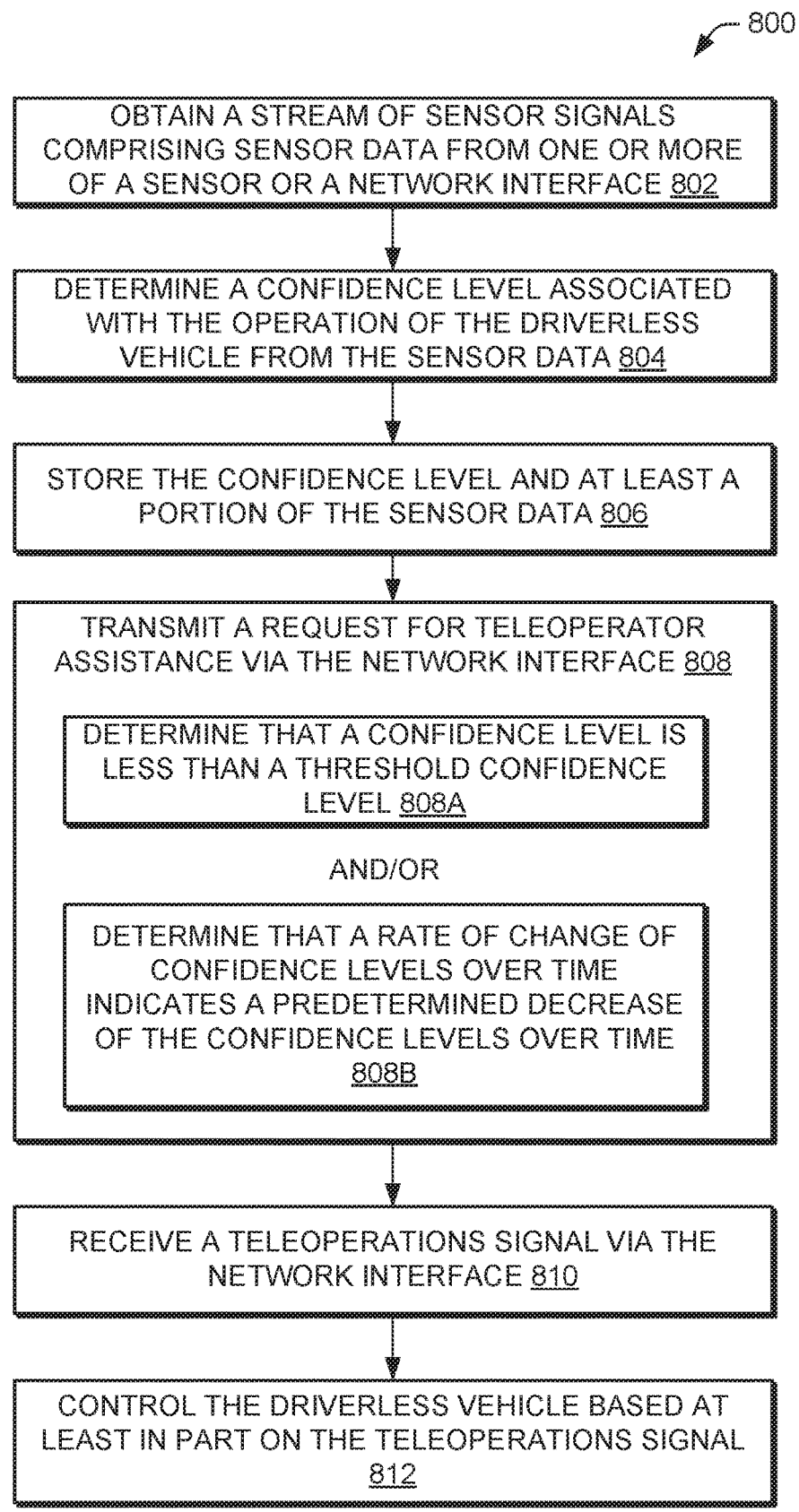
FIG. 8 is a flow diagram of an example process for operating a driverless vehicle.

FIG. 8 is a flow diagram of an example process 800 for operating a driverless vehicle including a vehicle controller. At 802, the example process 800 may include obtaining, at the driverless vehicle, sensor signals including sensor data from one or more sensors associated with the driverless vehicle and/or a network interface associated with the driverless vehicle. In some examples, the sensor data may be related to operation of the driverless vehicle and/or a region and/or environment through which the vehicle is navigating. For example, the sensor data may include sensor signals associated with the environment through which the driverless vehicle is traveling (e.g., video of the environment, a temperature of the environment, a city activity associated with the region).

At 804, the example process 800 may include determining a confidence level associated with the operation of the driverless vehicle from the sensor data according to any of the techniques discussed herein. In some examples, the vehicle may determine operation state data from the sensor data, as discussed herein. In some examples, the driverless vehicle may be configured with a model such as, for example, an ANN, FSM, and/or DAG to determine a confidence level from the sensor and/or operation state data, as discussed herein. In some examples, the driverless vehicle may determine a confidence level per time period (e.g., every two seconds, every other 5 clock cycles), per maneuver, and/or per vehicle controller determination.

At 806, the example process 800 may include storing the confidence level and at least a portion of the sensor data according to any of the techniques discussed herein. In some examples, the driverless vehicles may track determined confidence levels over time and may calculate a rate of change of the confidence levels over time (e.g., a slope of confidence levels over time, a moving window average of confidence levels over time). The vehicle may additionally or alternatively store a subset of the sensor data and/or the operation state data. In some examples, the vehicle may conduct such storage as part of a maintaining a record of confidence levels, sensor data, and/or confidence levels for a rolling window of time, responsive to a magnitude of a confidence level or a rate of change of confidence levels, responsive to a teleoperator request, responsive to operation state data (e.g., identification of a particular event may trigger such storage), and/or responsive to a communication channel degradation or anticipated degradation. In some examples, the driverless vehicle can determine to delete the stored data based on a passage of time (e.g., rolling window example), termination of an event, restoration of communication channel health, a teleoperations system indication, and/or transmission of at least part of the data to a teleoperations system.

At 808, the example process 800 may include transmitting a request for teleoperator assistance according to any of the techniques discussed herein. In some examples, the driverless vehicle may determine to send the request based at least in part on one or more of: detecting that the confidence level is below a threshold minimum confidence level (808A), detecting that a rate of change of confidence levels over time indicates a negative rate of change for a threshold duration of time (808B), detecting that the rate of change has a threshold magnitude (808B), detecting that the driverless vehicle is approaching a region where one or more other requests have been sent within a time period (e.g., last day, last half hour), detecting that the driverless vehicle is approaching a high-risk area (e.g., train crossing, school zone), and/or detecting that the driverless vehicle is considering maneuvers determined by the vehicle 102 as being ones that avoid a collision are of a type that is high-risk and is therefore associated with a low confidence (e.g., driving in an oncoming lane of traffic). In some examples, the driverless vehicle may determine a subset of sensor and/or operation state data to transmit with the request. In some examples, the driverless vehicle may transmit the request and subsequently transmit sensor and/or operation data upon receiving a request from the teleoperations system and/or at a time subsequent to transmission of the request.

At 810, the example process 800 may include receiving a teleoperations signal via the network interface according to any of the techniques discussed herein. For example, the teleoperations signal may include a command, a collaborative instruction, and/or a confirmation.

At 812, the example process 800 may include controlling the driverless vehicle based at least in part on the teleoperations signal according to any of the techniques discussed herein. In some examples, a command included in the teleoperations signal causes performance of an operation at the driverless vehicles. In some examples, the driverless vehicles may choose whether or not to permit performance of the operation. In some examples, the teleoperations signal may additionally or alternatively include a collaborative instruction, at least a portion of which the driverless vehicle may use to determine an operation to perform. In some examples, the teleoperations signal may additionally or alternatively include a confirmation of a decision made by the driverless vehicle, which the driverless vehicle may use to subsequently perform the operation pertinent to the decision.

Figure 9:
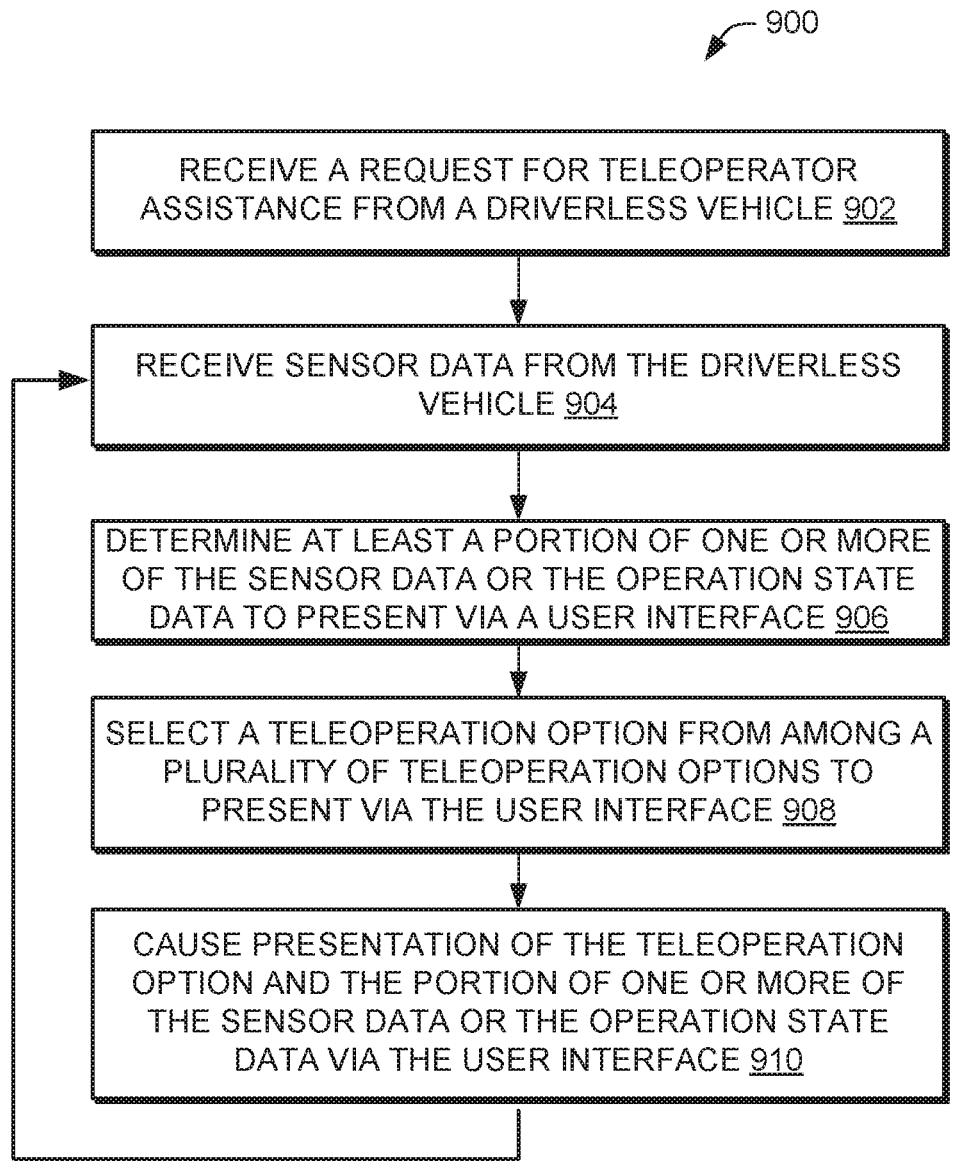
FIG. 9 is a flow diagram of an example process for operating a teleoperations system including a situational awareness engine.

FIG. 9 is a flow diagram of an example process 900 for operating a teleoperations system including a situational awareness engine. At 902, the example process 900 may include receiving a request for teleoperator assistance from a driverless vehicle according to any of the techniques discussed herein. In some examples, the request can include operation state data, such as, for example, an identification of the driverless vehicle, a location of the vehicle, object and/or event label(s), an occupancy of the vehicle, and/or a charge level of the vehicle.

At 904, the example process 900 may include receiving sensor data from the driverless vehicle, according to any of the techniques discussed herein.

At 906, the example process 900 may include determining at least a portion of the sensor data and/or the operation state data to present via a user interface, according to any of the techniques discussed herein. In some examples, the SAE may make this determination, and the determination may result in the SAE determining a presentation configuration to be presented at a user interface of teleoperations interface(s). The SAE may generate and/or forward a vehicle data subset and interface instructions to teleoperations interface(s) to cause such presentation.

At 908, the example process 900 may include selecting a teleoperation option from among a plurality of teleoperation options to present via the user interface according to any of the techniques discussed herein. In some examples, the SAE may make this determination. For example, the SAE may determine input option(s) to cause to be presented at teleoperations interface(s). The SAE may generate and/or forward a vehicle data subset and/or interface instructions to teleoperations interface(s) to cause such presentation.

At 910, the example process 900 may include causing presentation of the teleoperation option and the portion of the sensor and/or operation state data via the user interface, according to any of the techniques discussed herein. For example, the SAE may determine a vehicle data subset and/or interface instructions to transmit to teleoperations interface(s) to cause such presentation.

In some examples, additional sensor data is obtained and the example process 900 returns to 904.

Figure 10:
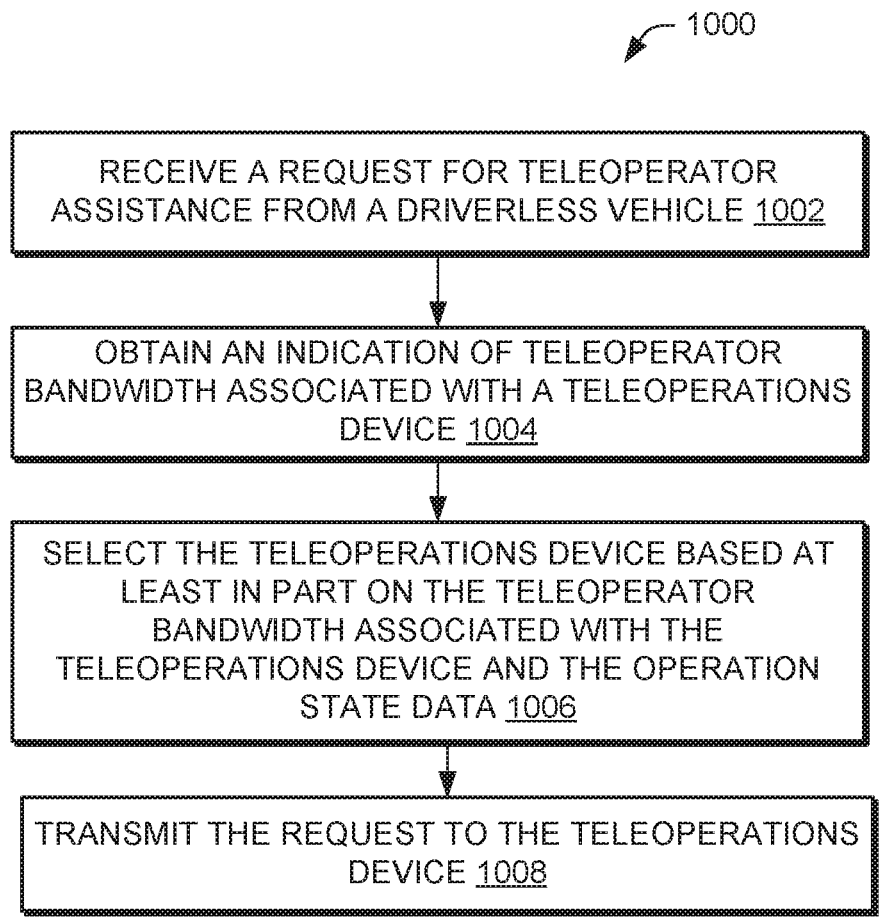
FIG. 10 is a flow diagram of an example process for operating a teleoperations system comprising multiple teleoperations devices.

FIG. 10 is a flow diagram of an example process 1000 for operating a teleoperations system including multiple teleoperations devices. At 1002, the example process 1000 may include receiving a request for teleoperator assistance from a driverless vehicle, according to any of the techniques discussed herein. For example, the request may be received at a gateway device and/or a teleoperations device including a teleoperations interface.

At 1004, the example process 1000 may include obtaining an indication of teleoperator bandwidth associated with a teleoperations device, according to any of the techniques discussed herein. In some examples, the indication can include a number of driverless vehicles assigned to a teleoperations device; an indication of progress of task completion at a teleoperations device; a number of requests in progress and/or a completion indication of one or more of the requests in progress; an indication of an engagement between a vehicle and another device, such as a teleoperations device and/or another vehicle; an indication of a level of escalation associated with a teleoperations device or the operation state data; and/or teleoperations system health, for example.

At 1006, the example process 1000 may include selecting the teleoperations device from among the multiple teleoperations devices based at least in part on the teleoperator bandwidth associated with the teleoperations device and the operation state data, according to any of the techniques discussed herein. In some examples, the SAE may determine one of the multiple teleoperations devices to select based on operation state data and/or teleoperator bandwidth. For example, the operation state data could include an indication of an "emergency" event that would "push aside" less-urgent requests and/or that may be presented to multiple teleoperations devices. In some examples, the example process 1000 can further increase creating a session between multiple teleoperations devices as to each other and between the vehicle to coordinate providing guidance to the vehicle, based on the operation state data and/or teleoperator bandwidth.

At 1008, the example process 1000 may include transmitting the request to the teleoperations device, according to any of the techniques discussed herein. In some examples, this can include transmitting the request for assistance, a vehicle data subset, and/or interface instructions.

It should be appreciated that the subject matter presented herein may be implemented as a computer process, a computer-controlled apparatus, a computing system, or an article of manufacture, such as a computer-readable storage medium. While the subject matter described herein is presented in the general context of modules that may include hardware and/or software layers that execute on one or more computing devices, those skilled in the art will recognize that other implementations may be performed in combination with other types of program modules. Generally, software modules include routines, programs, components, data structures, and other types of structures that perform particular tasks or implement particular abstract data types. In some examples, any number of modules (hardware and/or software) may be employed and techniques described herein as employed by one or more modules may be employed by a greater or lesser number of modules.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A. A driverless vehicle comprising: a processor; a sensor; a network interface; and a memory having stored thereon processor-executable instructions that, when executed by the processor, configure the driverless vehicle to: obtain a stream of sensor signals comprising sensor data from one or more of the sensor or the network interface, the sensor data related to operation of the driverless vehicle; determine a confidence level associated with the operation of the driverless vehicle based at least in part on a portion of the sensor data; store the confidence level as a stored confidence level and at least a portion of the sensor data as associated sensor data; transmit a request for teleoperator assistance via the network interface, the request including the portion of the sensor data and the confidence level; receive a teleoperations signal via the network interface; and control the driverless vehicle based at least in part on the teleoperations signal.

B. The driverless vehicle of paragraph A, wherein the instructions, when executed by the processor, further configure the driverless vehicle to: store a sequence of confidence levels over a first period of time, the sequence of confidence levels associated with at least a portion of sensor data; and delete stored confidence levels after a second period of time.

C. The driverless vehicle of paragraph B, wherein the instructions, when executed by the processor, further configure the driverless vehicle to: determine a rate of change associated with one or more confidence levels in the stored sequence of confidence levels; detect an event based at least in part on one or more of the rate of change, one or more of the confidence levels of the stored sequence of confidence levels, or associated sensor data of the one or more confidence levels of the stored sequence of confidence levels; and based at least in part on the event, transmit the request for teleoperator assistance with at least part of the associated sensor data and the one or more confidence levels.

D. The driverless vehicle of either paragraph B or C, wherein the instructions, when executed by the processor, further configure the driverless vehicle to: obtain a request via the network interface from a teleoperations device to transmit the stored sequence of confidence levels and associated sensor data; and transmit the stored sequence of confidence levels and associated sensor data via the network interface.

E. The driverless vehicle of any one of paragraphs A-D, wherein the instructions, when executed by the processor, further configure the driverless vehicle to: determine confidence levels over time based at least in part on a portion of the sensor data; and determine a rate of change of the confidence levels over time.

F. The driverless vehicle of paragraph E, wherein the instructions, when executed by the processor, further configure the driverless vehicle to: initiate storing the confidence level and the portion of the sensor data based on one or more of: determining that a confidence level of the confidence levels is less than the threshold confidence level, or determining that the rate of change of the confidence levels indicates a predetermined decrease of the confidence levels over time.

G. The driverless vehicle of either paragraph E or F, wherein the multiple confidence levels include: a first confidence level associated with a first operation of the driverless vehicle; and a second confidence level associated with a second operation of the driverless vehicle.

H. The driverless vehicle of any one of paragraphs E-G, wherein the driverless vehicle transmits the request based at least in part on one or more of: determining that a confidence level of the confidence levels is less than the threshold confidence level, the threshold confidence level being an indication of a low confidence; or determining that the rate of change is indicative of an event.

I. The driverless vehicle of paragraph H, wherein determining that the rate of change is indicative of an event comprises one or more of: determining that the rate of change is negative and a magnitude of the rate of change is greater than a threshold magnitude of the rate of change, or determining that the rate of change is negative and a magnitude of the rate of change is equal to or exceeds the threshold magnitude for a duration of time.

J. The driverless vehicle of any one of paragraphs E-I, wherein the driverless vehicle transmits the request based at least in part on one or more of: determining that the driverless vehicles is moving at a speed that is below a speed limit or a speed of traffic; determining that the driverless vehicle is located in a defined geographical area; determining that the driverless vehicle is stopped at a position that is not identified as a stop location in a map stored in memory accessible to the processor; determining that the driverless vehicle is located within a defined distance of a geographical area from which multiple other requests have been sent; or determining that a classification of an object or event detected from the sensor data is associated with an indicator of high unpredictability.

K. The driverless vehicle of any one of paragraphs A-J, wherein: the network interface is configured to establish a communications link between the driverless vehicle and one or more other devices or driverless vehicles, the one or more other devices including a teleoperations device; the instructions, when executed by the processor, further configure the driverless vehicle to: determine a bandwidth of the communications link; transmit, via the network interface, at least a portion of the sensor data according to a first data representation rule; determine that a change in the bandwidth has occurred; and transmit, via the network interface, at least a portion of the sensor data according to a second data representation rule.

L. The driverless vehicle of paragraph H, wherein: the second data representation rule includes transmitting data one or more of less frequently or in an alternate form that requires less bandwidth to transmit, as compared to the first data representation rule, and the change includes a decrease in bandwidth.

M. The driverless vehicle of paragraph J, wherein the alternate form includes one or more of: a location identifier, a classification of an object or scene, a bounding box, or a compressed file.

N. A teleoperations system comprising: at least one processor; and at least one memory having stored thereon processor-executable instructions that, when executed by the system, configure the teleoperations system to: receive a request for teleoperator assistance from a driverless vehicle, the request including operation state data; receive sensor data from the driverless vehicle; based at least in part on the operation state data, determine at least a portion of one or more of the sensor data or the operation state data to present via a user interface; based at least in part on the operation state data, select a teleoperation option from among a plurality of teleoperation options to present via the user interface; and cause presentation of the teleoperation option and the portion of one or more of the sensor data or the operation state data via the user interface.

O. The teleoperations system of paragraph N, the instructions further configuring the teleoperations system to determine a configuration by which to represent the portion of one or more of the sensor data or the operation state data and the teleoperation option, the configuration including one or more of: a region that displays situational data that includes one or more of the portion of the sensor data or the operation state data; a region that displays the teleoperation option; a region that displays information regarding an environment in which the driverless vehicle is located; or a region that displays information regarding status, conditions affecting, or commands transmitted to one or more other vehicles of a fleet with which the driverless vehicles is associated.

P. The teleoperations system of either paragraph N or O, wherein determining at least the portion of one or more of the sensor data or the operation state data to represent includes one or more of: determining an available bandwidth of a communication link established between the network interface and the driverless vehicle; or obtaining a request for the portion of one or more of the sensor data or the operation state data.

Q. The teleoperations system of any one of paragraphs N-P, wherein the operation state data includes one or more of: a representation of sensor data, detected object or event data, path planning data, vehicle state information, or environmental data.

R. The teleoperations device of any one of paragraphs N-Q, wherein the teleoperation option includes one or more of: a command for the driverless vehicle to perform an operation; a collaborative instruction for use by the driverless vehicle to determine an operation of the driverless vehicle, the collaborative instruction including one or more of data characterizing an object, a scene, or another classification or revised operation parameters and being useable by a processor of the driverless vehicle to determine an operation to perform; or an option to confirm or deny a decision determined by the driverless vehicle.

S. The teleoperations system of any one of paragraphs N-R, the instructions further configuring the teleoperations system to: obtain a plurality of confidence levels from the driverless vehicle, the plurality of confidence levels corresponding to a time range of operation of the driverless vehicle; and causing presentation of the plurality of confidence levels via a user interface.

T. The teleoperations system of paragraph S, wherein causing presentation of the plurality of confidence levels further includes causing presentation of one or more of operation state data associated with the plurality of confidence levels or sensor data associated with the plurality of confidence levels.

U. The teleoperations system of any one of paragraphs N-T, wherein the sensor data includes historical sensor data corresponding to a range of time.

V. The teleoperations system of any one of paragraphs N-U, wherein the instructions further configure the teleoperations system to: identify that the operation state data includes a value associated with a previous interaction between a driverless vehicle and a teleoperations system; based on the identifying, obtain one or more of prior sensor data, prior operation state data, or prior teleoperator actions associated with the previous interaction; and cause presentation of one or more of the prior sensor data, the prior operation state data, or the prior teleoperator actions.

W. A non-transitory computer-readable media having stored thereon processor-executable instructions that, when executed by the computer system, the computer system to: receive a request for teleoperator assistance from a driverless vehicle, the request including operation state data; obtain an indication of teleoperator bandwidth associated with a teleoperations device; select the teleoperations device from among multiple teleoperations devices based at least in part on the teleoperator bandwidth associated with the teleoperations device and the operation state data; and transmit the request to the teleoperations device.

X. The non-transitory computer-readable media of paragraph W, wherein the teleoperator bandwidth includes a capacity of a teleoperator and the teleoperations device to monitor a subset of vehicles or to handle a request for assistance.

Y. The non-transitory computer-readable media of either paragraph W or X, the instructions further configuring the computer system to: disseminate the request to a subset of the multiple teleoperations devices, the subset including more than one teleoperations device; obtain sensor data from the driverless vehicle; provide at least a portion of one or more of the sensor data or the operation state data to the subset; obtain a first instruction from a first teleoperations devices of the subset; transmit the first instruction for presentation to a second teleoperations device of the subset; obtain a second instruction from the second teleoperations devices; determine a correspondence between the first instruction and the second instruction; and transmit either the first instruction or second instruction to the driverless vehicle, based at least in part on the correspondence.

Z. The non-transitory computer-readable media of any one of paragraphs W-Y, the instructions further configuring the computer system to: obtain an instruction from a first teleoperations device; identify that the instruction requires elevation; identify a subset of the multiple teleoperations devices having elevated credentials; transmit the instruction to a second teleoperations device, the second teleoperations device having elevated credentials; obtain a confirmation or a denial of the instruction from the second teleoperations device; and based on obtaining the confirmation, transmit the instruction to the driverless vehicle.

AA. The non-transitory computer-readable media of any one of paragraphs W-Z, wherein selecting the at least one teleoperations device includes a weighted decision based on one or more of: operation state data that includes one or more of: a representation of sensor data, detected object or event data, path planning data, vehicle state information, or environmental data; or an indication of teleoperator bandwidth.

What is claimed is:
1. A driverless vehicle comprising:
a processor;
a sensor;
a network interface; and
a memory having stored thereon processor-executable instructions that, when executed by the processor, configure the driverless vehicle to:
receive sensor data from at least one of the sensor or the network interface, the sensor data related to operation of the driverless vehicle;

determine a confidence level associated with the operation of the driverless vehicle based at least in part on a portion of the sensor data;
store the confidence level as a stored confidence level and at least the portion of the sensor data as associated sensor data;
transmit, based at least in part on the confidence level, a request for teleoperator assistance via the network interface, the request including the portion of the sensor data and the confidence level;
receive a teleoperations signal via the network interface; and
control the driverless vehicle based at least in part on the teleoperations signal.

2. The driverless vehicle of claim 1, wherein the sensor data comprises first sensor data and the instructions, when executed by the processor, further configure the driverless vehicle to:
store a sequence of confidence levels over a first period of time, the sequence of confidence levels associated with at least a second portion of second sensor data; and
delete stored confidence levels after a second period of time.

3. The driverless vehicle of claim 2, wherein the instructions, when executed by the processor, further configure the driverless vehicle to:
determine a rate of change associated with one or more confidence levels in the sequence of confidence levels;
detect an event based at least in part on at least one of the rate of change, the one or more confidence levels, or the second sensor data; and
based at least in part on the event, transmit the request for teleoperator assistance with at least part of the associated sensor data and the one or more confidence levels.

4. The driverless vehicle of claim 2, wherein the request comprises a first request and the instructions, when executed by the processor, further configure the driverless vehicle to:
obtain a second request via the network interface from a teleoperations device to transmit the sequence of confidence levels and the second sensor data; and
transmit the stored sequence of confidence levels and associated sensor data via the network interface.

5. The driverless vehicle of claim 1, wherein the instructions, when executed by the processor, further configure the driverless vehicle to:
determine confidence levels over time based at least in part on at least one of the first portion or a second portion of the sensor data; and
determine a rate of change of the confidence levels over time.

6. The driverless vehicle of claim 5, wherein the instructions, when executed by the processor, further configure the driverless vehicle to:
initiate storing the confidence level and the portion of the sensor data based on at least one of:
determining that a confidence level of the confidence levels is less than a threshold confidence level, or
determining that the rate of change of the confidence levels indicates a predetermined decrease of the confidence levels over time.

7. The driverless vehicle of claim 5, wherein the driverless vehicle transmits the request based at least in part on at least one of:
determining that a confidence level of the confidence levels is less than a threshold confidence level, the threshold confidence level being an indication of a low confidence; or
determining that the rate of change is indicative of an event, wherein determining that the rate of change is indicative of an event comprises at least one of:
determining that the rate of change is negative and a magnitude of the rate of change is greater than a threshold magnitude of the rate of change, or
determining that the rate of change is negative and a magnitude of the rate of change is equal to or exceeds the threshold magnitude for a duration of time.

8. The driverless vehicle of claim 5, wherein the driverless vehicle transmits the request based at least in part on one or more of:
determining that the driverless vehicles is moving at a speed that is below a speed limit or a speed of traffic;
determining that the driverless vehicle is located in a defined geographical area;
determining that the driverless vehicle is stopped at a position that is not identified as a stop location in a map stored in the memory;
determining that the driverless vehicle is located within a defined distance of a geographical area from which multiple other requests have been sent; or
determining that a classification of an object or event detected from the sensor data is associated with an indicator of high unpredictability.

9. The driverless vehicle of claim 1, wherein:
the network interface is configured to establish a communications link between the driverless vehicle and one or more other devices or driverless vehicles, the one or more other devices including a teleoperations device;
the instructions, when executed by the processor, further configure the driverless vehicle to:
determine a bandwidth of the communications link;
transmit, via the network interface, at least a first subset of the sensor data according to a first data representation rule;
determine that a change in the bandwidth has occurred; and
transmit, via the network interface, at least a second subset of the sensor data according to a second data representation rule, wherein the second subset is different than the first subset.

10. A teleoperations system comprising:
at least one processor; and
at least one memory having stored thereon processor-executable instructions that, when executed by the system, configure the teleoperations system to:
receive a request for teleoperator assistance from a driverless vehicle, the request including operation state data;
receive sensor data from the driverless vehicle;
based at least in part on the operation state data, determine at least a portion of one or more of the sensor data or the operation state data to present via a user interface;
based at least in part on the operation state data, select a teleoperation option from among a plurality of teleoperation options to present via the user interface; and
cause presentation of the teleoperation option and the portion of one or more of the sensor data or the operation state data via the user interface.

11. The teleoperations system of claim 10, the instructions further configuring the teleoperations system to determine a configuration by which to represent the portion of one or more of the sensor data or the operation state data and the teleoperation option, the configuration including one or more of:
- a region that displays situational data that includes one or more of the portion of the sensor data or the operation state data;
- a region that displays the teleoperation option;
- a region that displays information regarding an environment in which the driverless vehicle is located; or
- a region that displays information regarding status, conditions affecting, or commands transmitted to one or more other vehicles of a fleet with which the driverless vehicles is associated.

12. The teleoperations system of claim 10 further comprising a network interface and wherein determining at least the portion of one or more of the sensor data or the operation state data to represent includes one or more of:
- determining an available bandwidth of a communication link established between the network interface and the driverless vehicle; or
- obtaining a request for the portion of one or more of the sensor data or the operation state data.

13. The teleoperations system of claim 10, wherein the teleoperation option includes one or more of:
- a command for the driverless vehicle to perform an operation;
- a collaborative instruction for use by the driverless vehicle to determine an operation of the driverless vehicle, the collaborative instruction including one or more of data characterizing an object, a scene, or another classification or revised operation parameters and being useable by a processor of the driverless vehicle to determine an operation to perform; or
- an option to confirm or deny a decision determined by the driverless vehicle.

14. The teleoperations system of claim 10, the instructions further configuring the teleoperations system to:
- obtain a plurality of confidence levels from the driverless vehicle, the plurality of confidence levels corresponding to a time range of operation of the driverless vehicle; and
- causing presentation of the plurality of confidence levels via the user interface.

15. The teleoperations system of claim 14, wherein causing presentation of the plurality of confidence levels further includes causing presentation of one or more of operation state data associated with the plurality of confidence levels or sensor data associated with the plurality of confidence levels.

16. The teleoperations system of claim 10, wherein the instructions further configure the teleoperations system to:
- identify that the operation state data includes a value associated with a previous interaction between the driverless vehicle and the teleoperations system;
- based on the identifying, obtain one or more of prior sensor data, prior operation state data, or prior teleoperator actions associated with the previous interaction; and
- cause presentation of one or more of the prior sensor data, the prior operation state data, or the prior teleoperator actions.

17. A non-transitory computer-readable media having stored thereon processor-executable instructions that, when executed by a computer system, cause the computer system to:
- receive a request for teleoperator assistance from a driverless vehicle, the request including operation state data;
- obtain an indication of teleoperator bandwidth associated with a teleoperations device;
- select the teleoperations device from among multiple teleoperations devices based at least in part on the teleoperator bandwidth associated with the teleoperations device and the operation state data; and
- transmit the request to the teleoperations device.

18. The non-transitory computer-readable media of claim 17, the instructions further configuring the computer system to:
- disseminate the request to a subset of the multiple teleoperations devices, the subset including more than one teleoperations device;
- obtain sensor data from the driverless vehicle;
- provide at least a portion of one or more of the sensor data or the operation state data to the subset;
- obtain a first instruction from a first teleoperations devices of the subset;
- transmit the first instruction for presentation to a second teleoperations device of the subset;
- obtain a second instruction from the second teleoperations devices;
- determine a correspondence between the first instruction and the second instruction; and
- transmit either the first instruction or second instruction to the driverless vehicle, based at least in part on the correspondence.

19. The non-transitory computer-readable media of claim 17, the instructions further configuring the computer system to:
- obtain an instruction from a first teleoperations device;
- identify that the instruction requires elevation;
- identify a subset of the multiple teleoperations devices having elevated credentials;
- transmit the instruction to a second teleoperations device, the second teleoperations device having elevated credentials;
- obtain a confirmation or a denial of the instruction from the second teleoperations device; and
- based on obtaining the confirmation, transmit the instruction to the driverless vehicle.

20. The non-transitory computer-readable media of claim 17, wherein selecting the teleoperations device includes a weighted decision based on one or more of:
- operation state data that includes one or more of:
  - a representation of sensor data,
  - detected object or event data,
  - path planning data,
  - vehicle state information, or
  - environmental data; or
- an indication of teleoperator bandwidth.

* * * * *